CAB SIGNALLING SYSTEM FOR RAILROADS

Filed May 19, 1951 15 Sheets-Sheet 1

INVENTORS.
H. C. KENDALL AND
F. P. ZAFFARANO
BY Neil D. Preston,
THEIR ATTORNEY

CAB SIGNALLING SYSTEM FOR RAILROADS

Inventors
H.C. KENDALL AND
F. P. ZAFFARANO

By Neil D. Preston,
THEIR Attorney

INVENTORS.
H.C. KENDALL AND
F.P. ZAFFARANO
BY Neil D. Preston,
THEIR ATTORNEY

CAB SIGNALLING SYSTEM FOR RAILROADS

Inventors
H.C. KENDALL AND
F. P. ZAFFARANO
By Neil W. Preston,
THEIR Attorney

Jan. 17, 1956 H. C. KENDALL ET AL 2,731,552

CAB SIGNALLING SYSTEM FOR RAILROADS

Filed May 19, 1951 15 Sheets-Sheet 5

WAVEFORMS FOR CODE DETECTION AND COINCIDENCE APPARATUS (DIRECT-CURRENT CODES IN TRACKS)

Inventors
H.C. KENDALL AND
F. P. ZAFFARANO

By Neil W. Preston,
THEIR Attorney

Jan. 17, 1956 H. C. KENDALL ET AL 2,731,552

CAB SIGNALLING SYSTEM FOR RAILROADS

Filed May 19, 1951 15 Sheets-Sheet 6

WAVEFORMS FOR CODE DETECTION AND COINCIDENCE APPARATUS (ALTERNATING-CURRENT CODES IN TRACKS)

Inventors
H. C. KENDALL AND
F. P. ZAFFARANO

By *Neil D. Preston*,

THEIR Attorney

CAB SIGNALLING SYSTEM FOR RAILROADS

Inventors
H.C. KENDALL AND
F.P. ZAFFARANO

By

Neil W. Preston,

THEIR Attorney

Inventors
H. C. KENDALL AND
F. P. ZAFFARANO
By Neil W. Preston,
THEIR Attorney

CAB SIGNALLING SYSTEM FOR RAILROADS

Filed May 19, 1951 15 Sheets-Sheet 9

Inventors
H. C. KENDALL AND
F. P. ZAFFARANO
By Neil D. Preston,
THEIR Attorney

Inventors
H. C. KENDALL AND
F. P. ZAFFARANO

By Neil W. Preston,
THEIR Attorney

CAB SIGNALLING SYSTEM FOR RAILROADS

Filed May 19, 1951 15 Sheets-Sheet 11

Inventors
H.C. KENDALL AND
F.P. ZAFFARANO
By
Neil W. Preston,
THEIR Attorney

Inventors
H. C. KENDALL AND
F. P. ZAFFARANO

By Neil D. Preston,
THEIR Attorney

Inventors
H.C. KENDALL AND
F. P. ZAFFARANO
By Neil W. Preston,
THEIR Attorney

CAB SIGNALLING SYSTEM FOR RAILROADS

Filed May 19, 1951 15 Sheets-Sheet 14

Inventors
H. C. KENDALL AND
F. P. ZAFFARANO
By Neil W. Preston,
THEIR Attorney

CAB SIGNALLING SYSTEM FOR RAILROADS

Filed May 19, 1951 15 Sheets-Sheet 15

*INVENTORS.*
H.C. KENDALL AND
F.P. ZAFFARANO
*BY* Neil D. Preston,
THEIR ATTORNEY United States Patent Office 2,731,552 Patented Jan. 17, 1956

2,731,552

CAB SIGNALLING SYSTEM FOR RAILROADS

Hugh C. Kendall and Frank P. Zaffarano, Rochester, N. Y., assignors to General Railway Signal Company, Rochester, N. Y.

Application May 19, 1951, Serial No. 227,164

26 Claims. (Cl. 246—63)

This invention relates to railway signalling systems, and more particularly pertains to a cab signalling system of the continuous inductive type providing for the control of train-carried cab signals which are operated in response to either direct or alternating coded currents in the track rails.

Various prior cab signalling systems of the continuous inductive coded type employ coded alternating currents in the track rails, each complete code cycle comprising an "on" period during which alternating current flows and an "off" period during which there is no current applied to the track rails. In such a system different distinctive code rates are employed, such as 75, 120, and 180 code cycles per minute, to give the basis for the selection of the different signal indications in accordance with traffic conditions. Receiving apparatus on each train detects the current "on" periods in the track rails and decodes the information by distinguishing between the different rates to selectively control the cab signals and/or train control equipment.

On the other hand, many present day wayside signalling systems use the application of coded direct current to the track rails to effect the control of the wayside signals in accordance with distinctive code rates selected for the different traffic conditions. In such a coded wayside signalling system, each code cycle comprises an "on" period during which sustained direct current flows in the track rails, and an "off" period during which there is no current in the track rails. It is likewise customary in a coded wayside signalling system to employ the same code rates as above mentioned in connection with the prior cab signalling systems. However, the usual cab signalling system organized to respond to coded alternating current in the track rails does not respond satisfactorily to coded direct current in the track rails. One prior solution to this difficulty requires that alternating current be superimposed upon the coded direct current already applied to the track rails for the wayside signals but this solution involves considerable expense.

The problem also arises that a train equipped with cab signalling apparatus adapted to operate over a portion of railroad having one kind of coded track current may at times be required to operate in territory where a different kind of coded track current is used. For example, a train may be equipped with cab signalling equipment allowing it to operate in territory employing coded alternating track current, but such equipment would be inoperative if the train were to travel over territory in which coded direct currents were used.

In view of these considerations, the present invention provides a cab signalling system including train-carried apparatus that is responsive to either coded direct current or coded alternating current in the track rails. Thus, one object of the present invention is to provide a continuous inductive cab signalling system responsive to either direct or alternating current codes but organized in a manner to be unresponsive to foreign currents while still retaining high sensitivity to the legitimate currents used for the different codes.

Also, some railroads, instead of using direct current for their coded track circuits governing the wayside signals, employ rectified alternating current. Thus, another object of the present invention is to provide a cab signalling system which will likewise be responsive to either full-wave or half-wave rectified alternating-current codes.

Tests have shown that the track rails of many railroads are found to be magnetized at their ends or at intermediate points, so that a sensitive code detecting system would be acted upon during the movement of the train over the rails the same as if a direct current were applied to the track rails and then removed. Such magnetized portions of the track rails are probably present because of the use of magnetic cranes in the handling of the rails, or they may be present because of the use of the commonly known magnetic flaw detectors. Likewise, various portions of the rolling stock may also become magnetized such as the wheels, axles, or the like, during handling procedures. Therefore, another purpose of the present invention is to provide train-carried code detecting apparatus which will be sensitive to the leading and trailing edges of coded currents "on" periods, and yet remain immune to random responses caused by magnetic portions of rails or adjacent rolling stock insofar as the giving of a false indication by the cab signal is concerned.

Generally speaking, and without any attempt to define the exact nature and scope of the present invention, it is proposed that the train-carried equipment include a pair of receivers one located adjacent each rail, two amplifying equipments one for each receiver, a coincidence circuit organization which will give an output only if coded rail current is applied and removed in both track rails at the same time, and a decoding apparatus responsive to the output of said coincidence circuit organization to distinctively control the cag signals in accordance with the rate of the code then being received. With train-carried equipment thus organized, no false or undesired cab signal is given when inductive disturbances occur at random in the track rails.

More specifically, each receiver is tuned to a particular frequency, preferably different than any coded alternating current in the rails, so that the application and removal of the coded currents (either A. C. or D. C.) will produce transient voltages in the receivers. These transient voltages induced in each receiver by the application and removal of energy in the track rails are passed from that receiver through a corresponding amplifying equipment, which in turn give outputs to the coincidence circuit organization. Since legitimate coded current is applied to and removed from both track rails at the same time, the outputs of both amplifying equipments are received simultaneously by the coincidence circuit organization which then provides an output to the decoding apparatus at the beginning and end of each code "on" period. But when some extraneous voltage is induced in only one receiver, due to a magnetized section of rail, or the like, this voltage is passed through the associated amplifying equipment which supplies an output to the coincidence circuit organization. But since there is no corresponding output from the other amplifying equipment, that output which is supplied is dissipated and the coincidence circuit organization does not provide an output to the decoding apparatus under such circumstances. Thus, voltages induced at random in the receivers with respect to only one or the other rail at any one time, are not effective to act upon the decoding apparatus. In this way, the present invention prevents erroneous response to track conditions which are not symmetrical with respect to both tracks.

In providing code detecting apparatus which is sufficiently sensitive to respond to the application and removal of direct current to the track rails, it is also sufficiently sensitive to be affected by vibration of the receivers in the earth's magnetic field. In order to obviate this difficulty, it is proposed to make each receiver in the form of an inverted U-shaped core structure with windings on each leg so connected in series that when a magnetic field is produced in opposite directions through the windings (viz. opposite vertical directions) the induced voltages in the windings are additive; but when a magnetic field is produced in the same vertical direction the voltages induced in the windings are in opposition and the net output is unimportant. More specifically, when current is applied to the track rails, the change in the magnetic field about the rail causes a magnetic field to be set up in the U-shaped core structure so that the flux is passing upwardly in one leg and downwardly in the other. This condition causes the induced voltages in the two windings to be additive. On the other hand, it is apparent that the magnetic field produced either by the earth or some passing magnetic field would cause flux to pass through both legs of the U-shaped core in the same direction, and the induced voltages thus produced are in opposition and cancel each other.

In addition, it is proposed to provide an electronic decoding apparatus which requires a plurality of output pulses from the rail coincidence circuit organization in order to initially give any cab signal indication less restrictive than stop. This decoding apparatus is also organized to require the continued and repeated reception of the code of a particular rate. In order to provide these features, the decoding apparatus includes a plurality of code rate discriminators each one adapted to supply an output only if the codes are received at regularly spaced intervals characteristic of its particular code rate. Each of these code rate discriminators includes two electronic timers which are operated in succession in response to an output from the coincidence circuit apparatus. Each timer of a particular code rate discriminator is constructed to operate for a time interval characteristic of the particular code rate assigned to that discriminator. Each timer is provided with a gate which is momentarily operated at the end of its timing operation.

Control circuit means are provided for each different code rate discriminator which is operated only provided a successive pulse from the rail coincidence circuit organization occurs simultaneously with the rendering active of the two gates of that discriminator. In this way, the apparatus is organized so that the rail coincidence circuit organization must supply three output pulses in succession at that proper time spacing which is characteristic of a particular code rate in order to render the control circuit means active. For convenience in the description, this has been termed triple coincidence of the code cycle timing or just briefly triple time coincidence to distinguish from the rail coincidence feature previously mentioned. In other words, the present invention provides that the response to the coded rail currents will be effective only if a detection of the "on" periods occurs for a plurality of times for any particular one of the different code rates.

As above intimated, the leading and trailing edges of each code "on" period provides changes in the magnetic flux surrounding the track rails, and these changes produce transient voltages in the receiver coils. It has been found in practice that the flux changes occurring at the trailing edges of the code "on" periods cause transient voltages of greater amplitude in the receiver coils or windings than are produced by the changes in flux for the leading edges of the code "on" periods. This has been found to be particularly true for the longer track sections to the extent that the trailing edges of the code "on" periods will produce detectable transient voltages even though the leading edges are so attenuated that no detectable transient voltages are induced in the receiver coils.

Furthermore, it has been found that direct-current code "on" periods may be somewhat distorted in their transmission over the track rails due to various ballast conditions; and in the case of long track circuits where repeater relays are employed, this distortion may be rather pronounced. In some cases, this distortion may be caused by what is known as the storage battery effect, i. e. the code current charges the ballast in effect so that current continues to flow momentarily even after the energy has been removed at the transmitting end. Thus, although the code "on" periods are made substantially equal to the "off" periods, this relation does not remain the same for the entrance end of the track circuit. However, the code cycle time of each complete code cycle is always the same regardless of the distortion of the impulse or "on" period.

For the above and other reasons, it is proposed in accordance with the present invention to provide decoding apparatus which is responsive only to the complete time period of a code cycle, i. e. from the leading edge of one "on" period to the leading edge of the next, or from the trailing edge of one "on" period to the trailing edge of the next. With such decoding apparatus, it will be obvious that it can respond to the transient voltages produced by either the leading or trailing edges of the code "on" period depending upon which is initially received and depending upon which is the greatest in amplitude. Since the code rates are determined by code oscillators, or the like, which are constructed to operate within very close margins of the selected code rate, it is possible to provide time gating in the decoding apparatus which is relatively sharp, and thus effectively discriminate against most random disturbances occurring in the track rails and acting upon the train carried receiver coils.

These general characteristics are to be accomplished by the use of suitable electronic receiving and discriminating apparatus which will provide distinctive outputs in the train-carried apparatus for the different code rates to give proper cab signal indications.

Other objects, purposes, and characteristic features of the present invention will be in part obvious from the accompanying drawings and in part pointed out as the description of the invention progresses.

In describing the invention in detail, reference will be made to the accompanying drawings in which like reference characters designate corresponding parts throughout several views, and in which.

Figure 4:
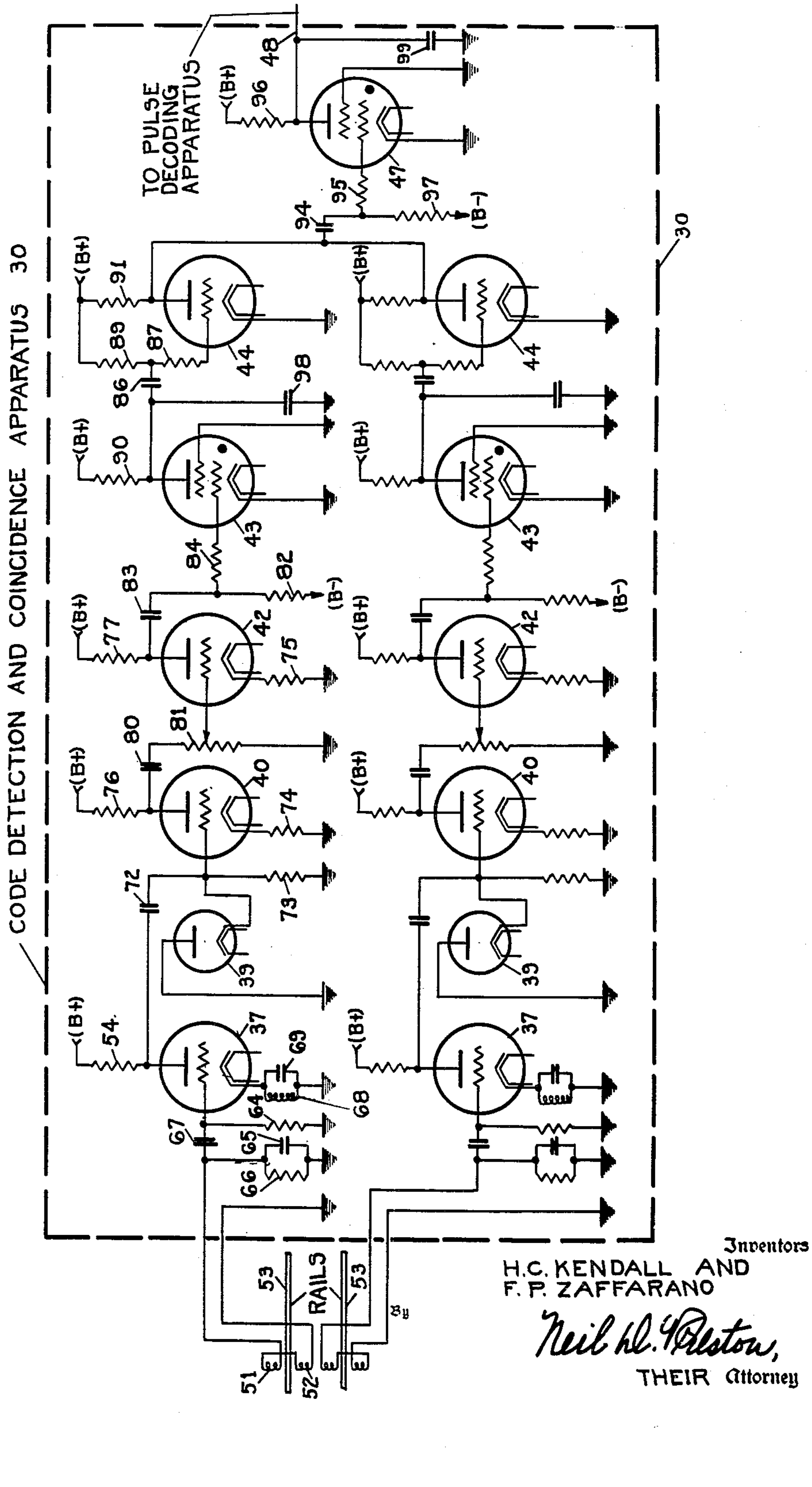
Fig. 4 shows in a diagrammatic manner the circuit connections for the code detection and coincidence apparatus of the cab signalling system of the present invention.
Figure 11A:
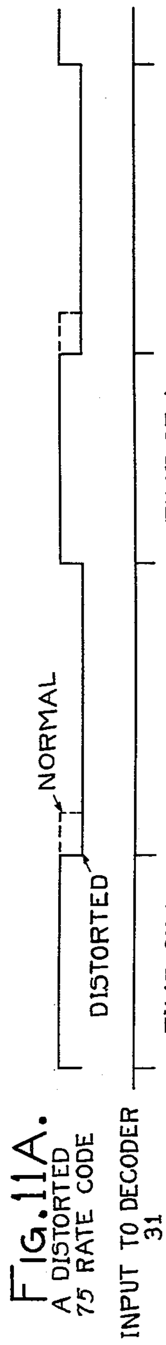
Figure 11B:
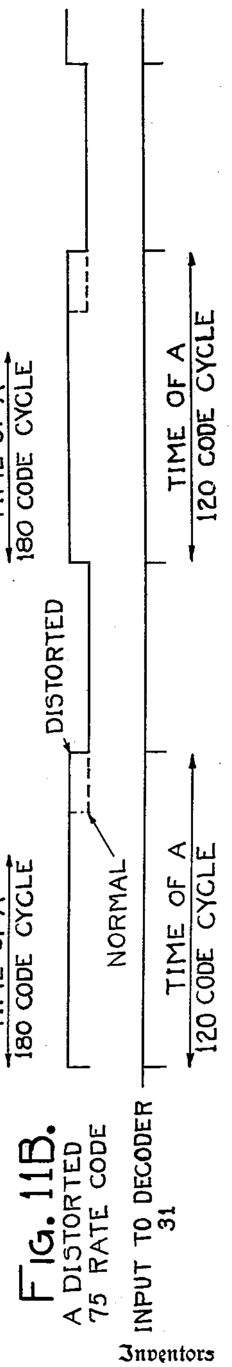
Figure 8A:
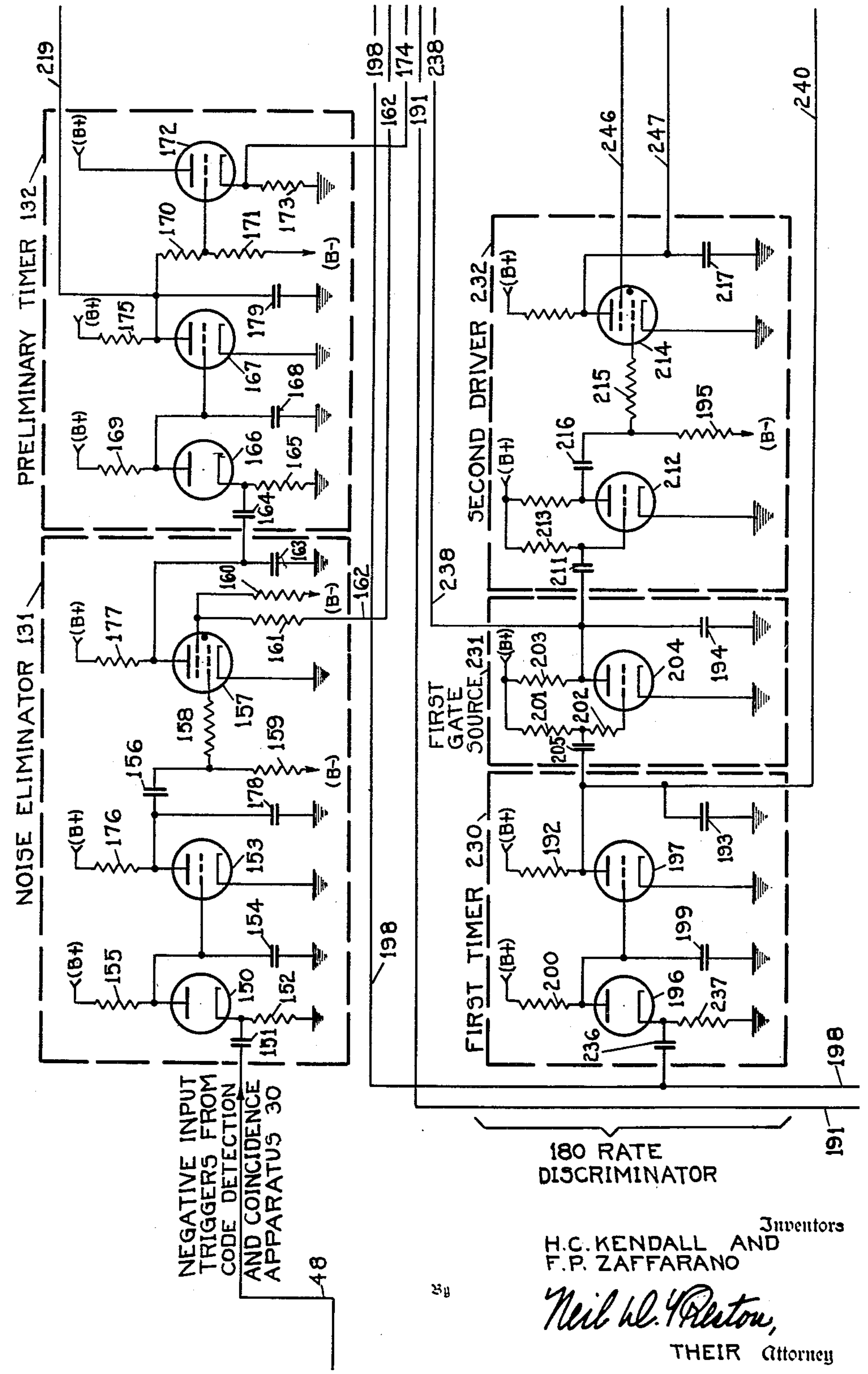
Figure 8B:
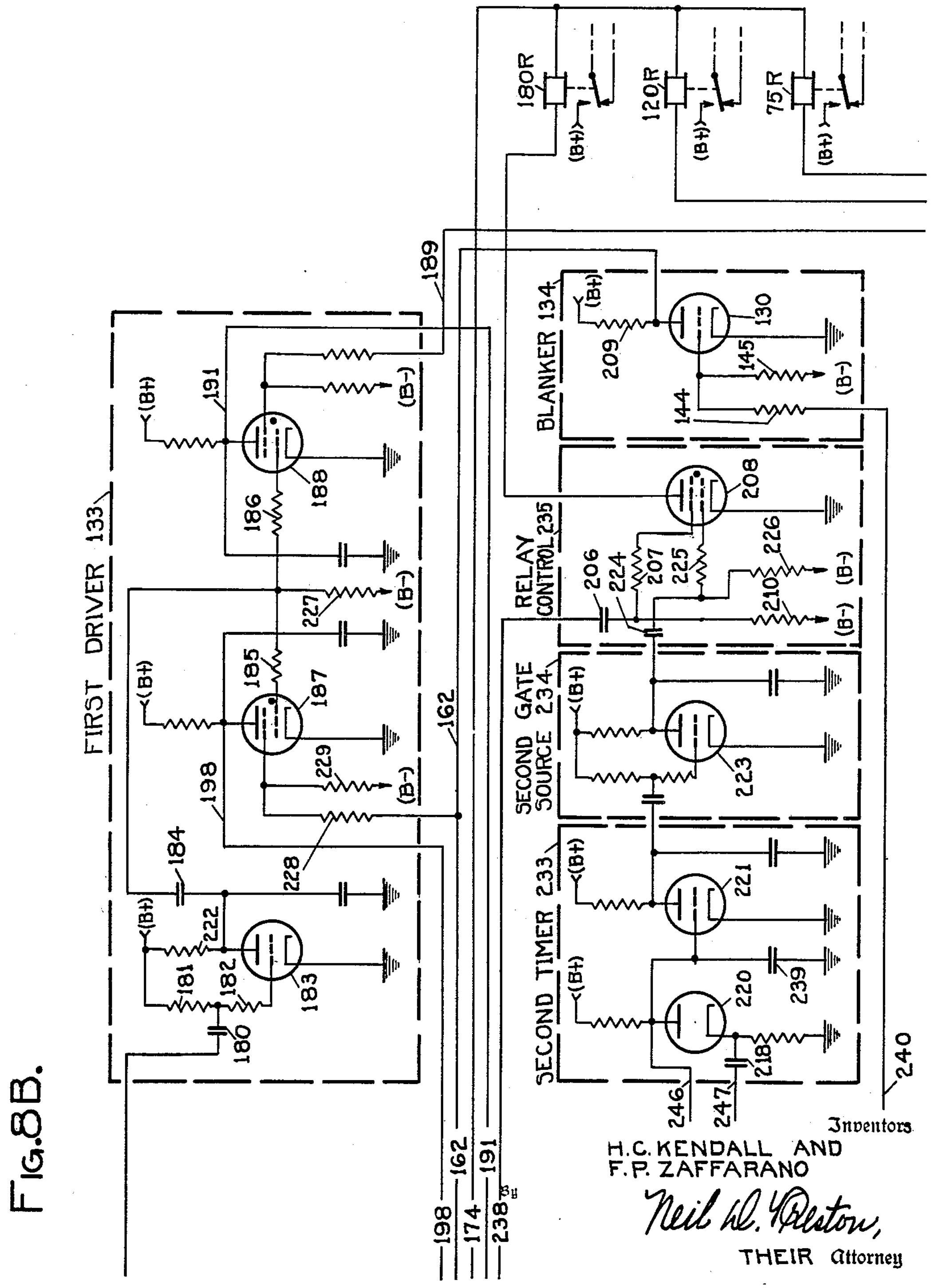
Figure 8C:
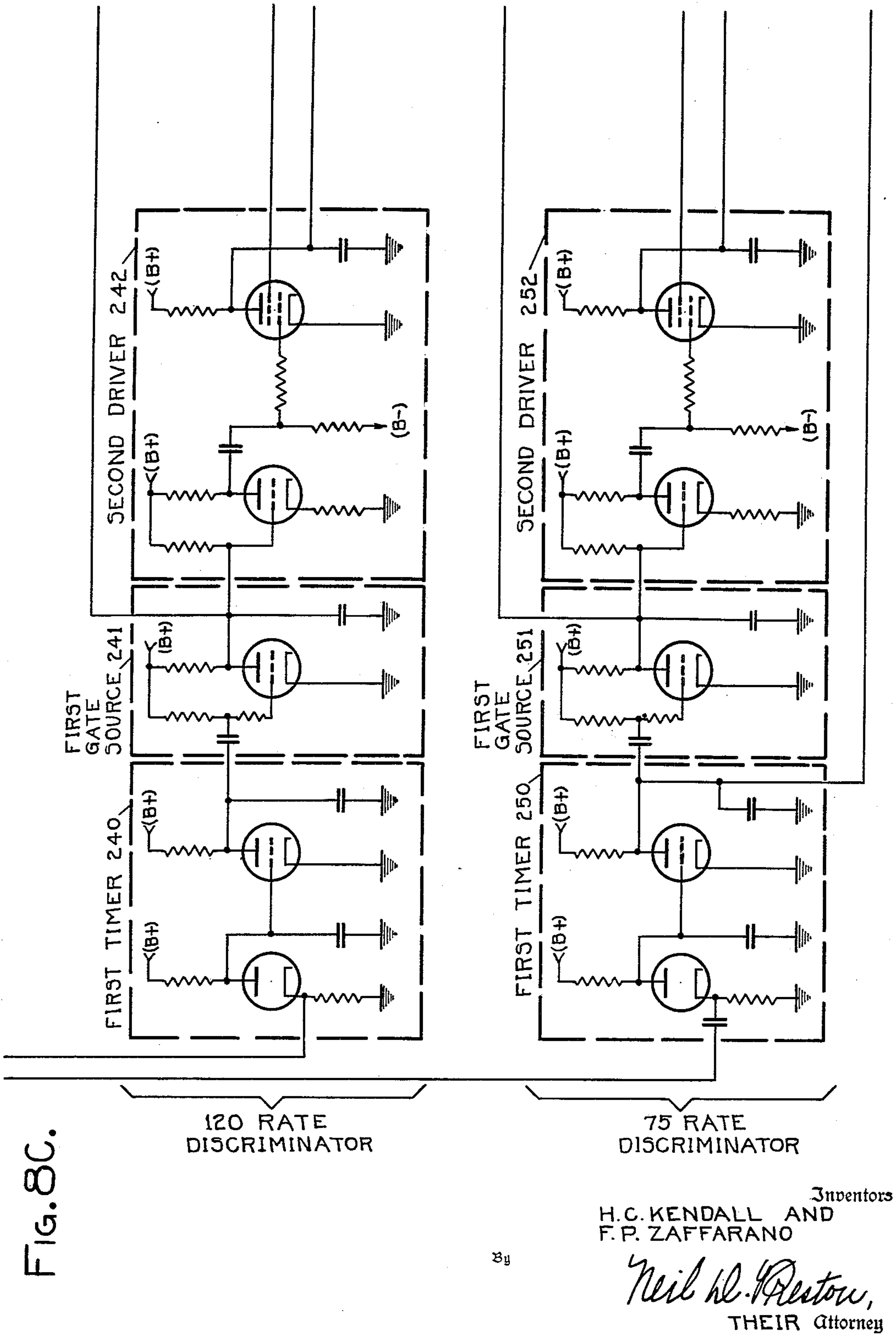
Figure 8D:
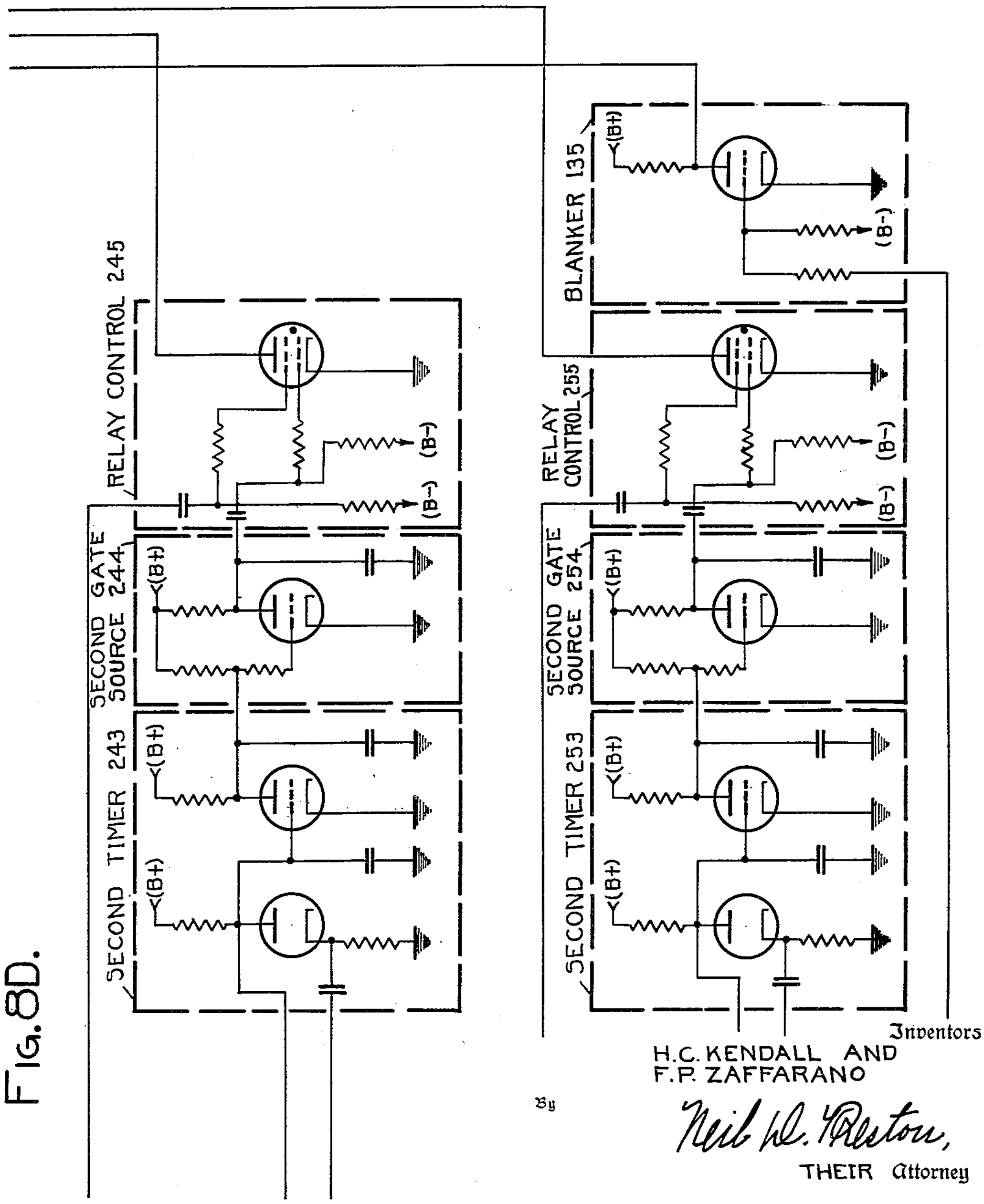
Figure 9A:
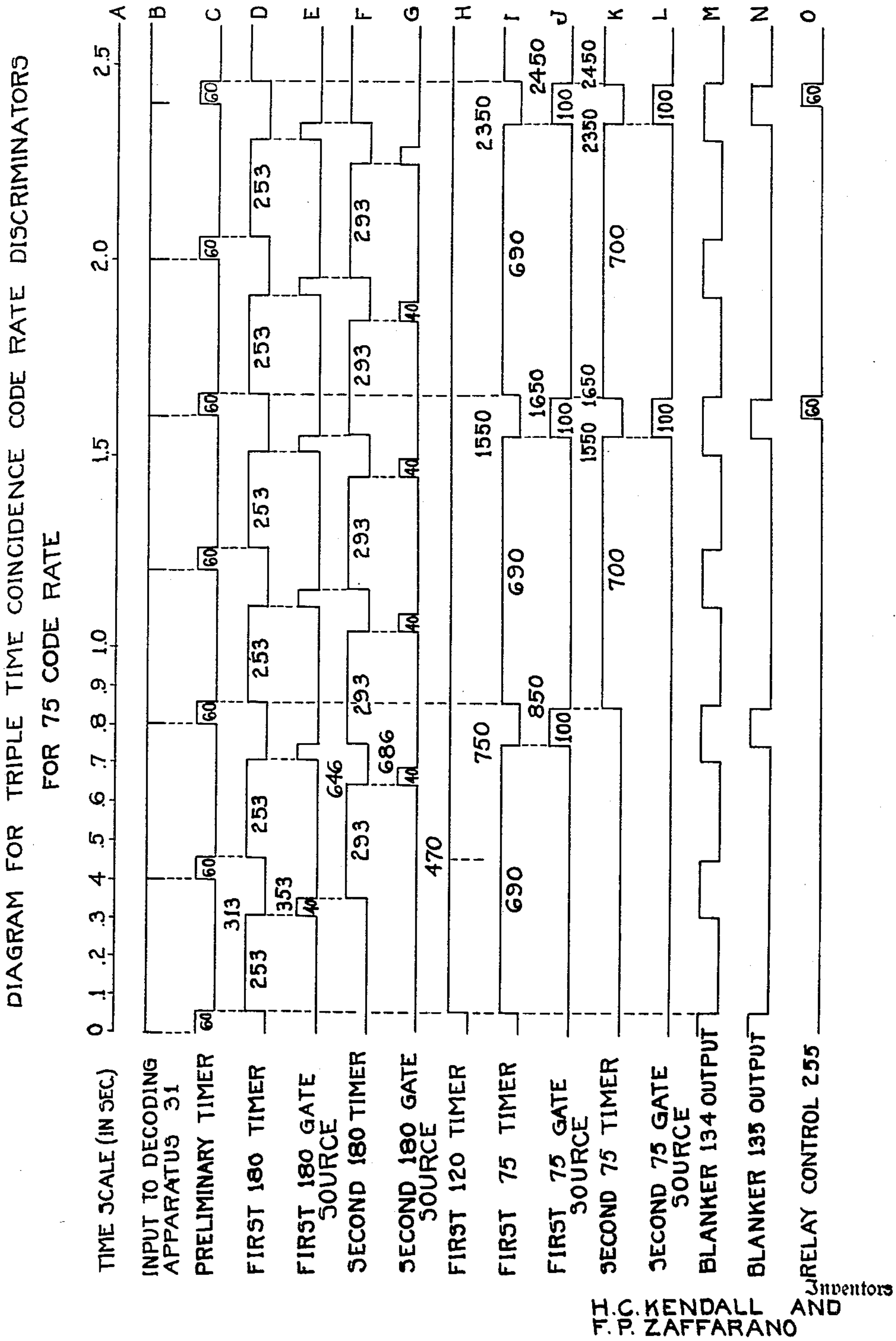
Figure 9B:
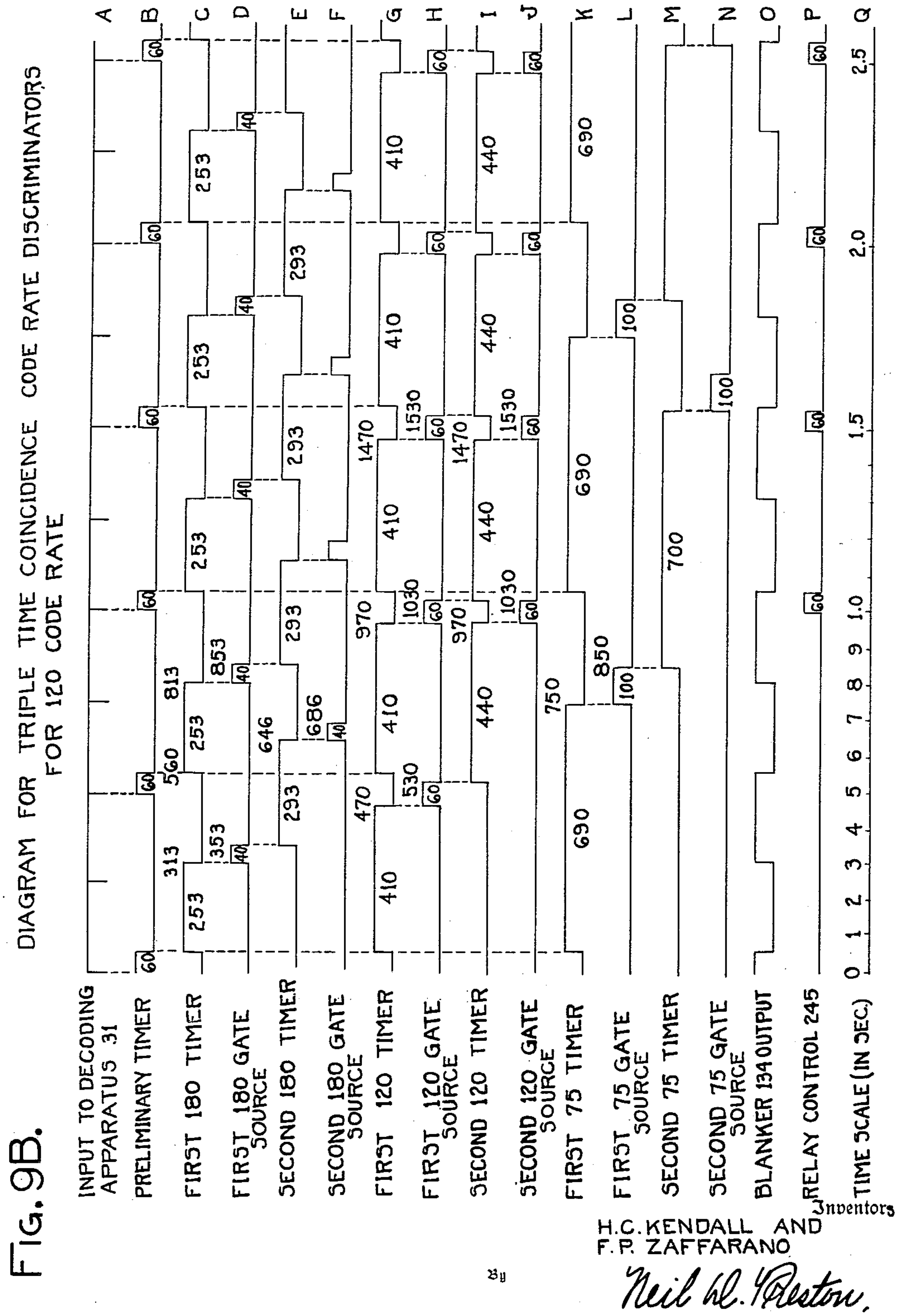
Figure 9C:
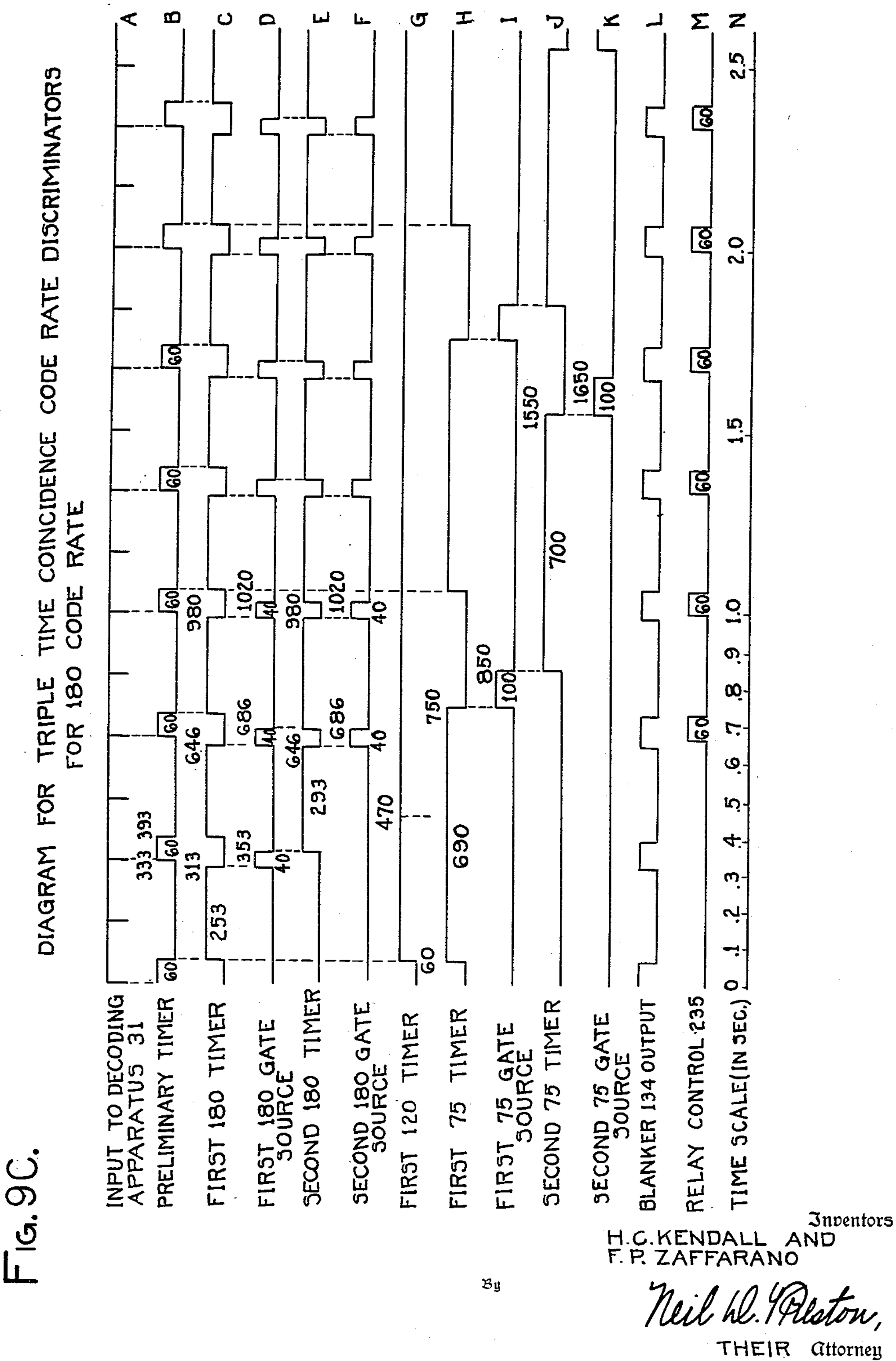
Figure 10A:
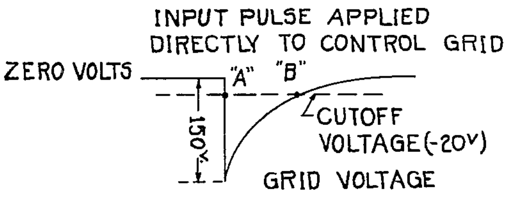
Figure 10B:
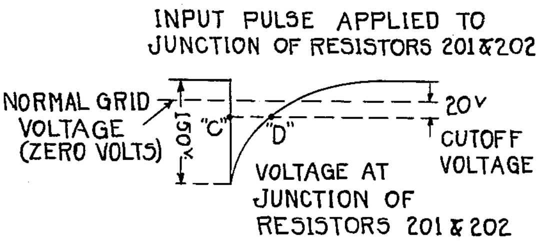
Figure 12:
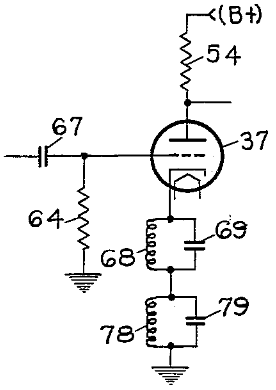
Figure 13:
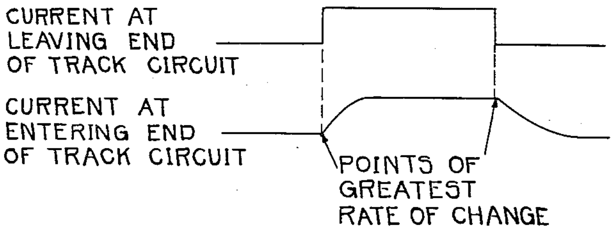

Figs. 8A and 8B when placed end to end with Figs. 8C and 8D located respectively beneath Figs. 8A and 8B, show a detailed circuit diagram of the decoding apparatus employed in the system of the present invention;

Figs. 9A, 9B and 9C are diagrams of typical timing operations which may occur in the decoding apparatus shown in detail in Figs. 8A, 8B, 8C and 8D;

Figs. 10A and 10B are diagrams to illustrate a specific feature with respect to the operation of the various code rate discriminators;

Figs. 11A and 11B are diagrams to show how particular code rates may become distorted and thus simulate different code rates;

Fig. 12 is a modification of Fig. 4 to provide additional filter means to act degeneratively with respect to certain alternating currents; and Fig. 13 demonstrates why distortion of the code "on" periods by the track circuit characteristics has but little effect on the response of the code detection apparatus.

To simplify the illustration and facilitate the explanation of the invention, the various parts and circuits are shown diagrammatically and conventional illustrations are used. The drawings have been made more with the idea in mind to make it easy to understand the principles of operations, than to illustrate the specific construction and arrangement of parts that would be used in practice. The various relays and their contacts are shown in a conventional manner, and symbols are used to indicate connections to the terminals of battery or other sources of electrical current instead of showing all of the wiring connections to these terminals. The symbols (+) and (—) indicate the positive and negative terminals respectively of a suitable source of direct current. The symbols (B+) and (B—) indicate connections to the opposite terminals of a suitable source of direct current of higher voltage used for the operating voltage of various electron tubes. This latter voltage source has intermediate tap between the (B+) and (B—) terminals which is indicated as being a ground connection.

GENERAL ORGANIZATION

Figure 1:
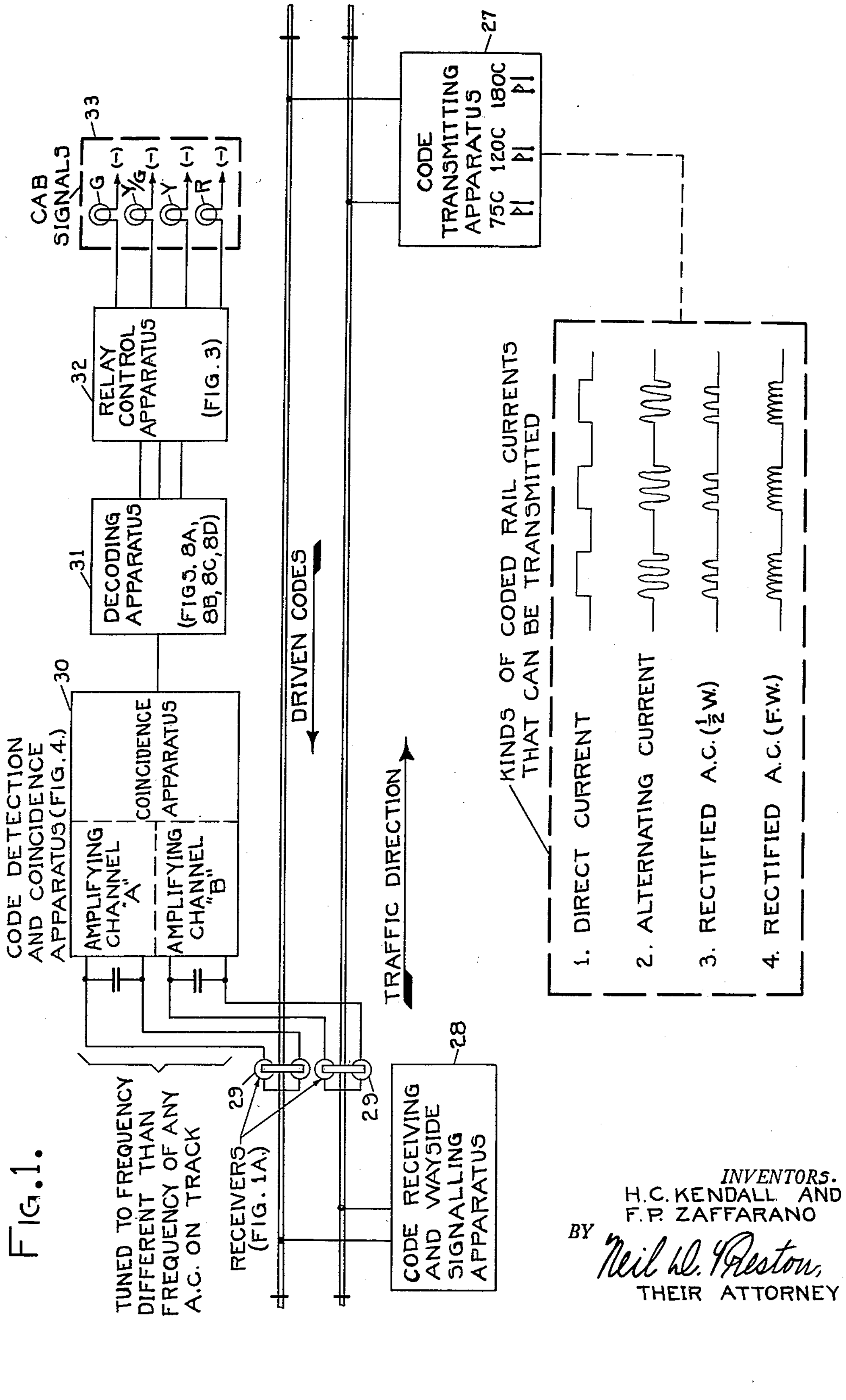
Fig. 1 shows in block diagram form the cab signalling system embodying the present invention.

The continuous inductive cab signalling system of the present invention comprises a combination shown in block form in Fig. 1 of the drawings. The combination includes both wayside apparatus and vehicle-carried apparatus.

The wayside apparatus includes for each different track section, code transmitting appartus 27 at the exit end of that section and code receiving and wayside signalling apparatus 28 at the entrance end. The code transmitting apparatus intermittently applies current to the rack rails a spaced inervals to comprise the successive code cycles. In other words, each code cycle comprises an "on" period during which current flows and an "off" period during which there is no current. The rate at which the successive code cycles occur is selected in accordance with traffic conditions, while the number of different predetermined code rates employed is dependent upon the number of indications desired for both the wayside signalling and the cab signalling. For the purposes of the present disclosure, it is assumed that three different distinctive code rates are employed, such as 75, 120 and 180 code cycles per minute.

The driven codes thus applied to the track rails are received by the code receiving and wayside signalling apparatus at the entrance end to the track section. The rate of the particular code being received causes a distinctive operation of the code receiving apparatus which is effective to control the adjacent wayside signal and also to determine the rate of the code to be transmitted by the code transmitting apparatus for the next track section to the rear. Obviously, when a train is in a particular track section, no code is received at the entrance end of the track section because such train effectively shunts the track rails. When no code is received, the code receiving and wayside signalling apparatus causes the adjacent signal to be held at stop and the proper code rate to be applied to the next section in the rear.

Although a train may be shunting the rails insofar as the code receiving apparatus at the entrance to the track section is concerned, the driven code is still being applied to the track rails at the exit end of the section; and, since the receivers of the vehicle-carried apparatus are located in front of the pilot wheels of the train, they are acted upon by the codes in advance of the vehicle.

In Fig. 1, the different kinds of coded rail currents that may be transmitted have been listed as including direct current, alternating current, rectified alternating current both of the half-wave type and of the full-wave type. Of course, the code transmitting apparatus for any particular track section ordinarily employs only one kind of current, but in accordance with the present invention, the wayside apparatus may use any one of the different kinds of coded current enumerated and still be capable of causing proper response of the vehicle-carried apparatus. The various reasons for this will be developed as the description progresses.

Figure 1A:
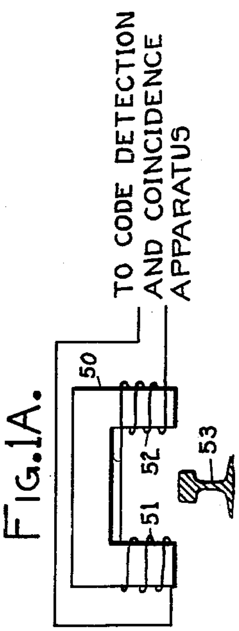
Fig. 1A shows one possible structure of a receiver to be mounted on the train adjacent the track rails which is operative to minimize the effects of extraneous magnetic fields such as the earth's magnetic field.

Referring to Fig. 1, it will be noted that there is a receiver 29 mounted adjacent each rail and each receiver is provided with two windings on the vertical legs of its inverted U-shaped core structure, as shown in greater detail in Fig. 1A of the drawings. This particular structure is employed to minimize the presence of stray magnetic fields and also the earth's magnetic field.

Each receiver is connected to the code detection and coincidence apparatus 30 of the vehicle-carried equipment. As indicated in Fig. 1, the code detection and coincidence apparatus 30 (see Fig. 4 for detailed circuit connections) comprises two separate amplifying channels "A" and "B" each of which is associated with one of the receivers mounted in an inductive relation with one of the track rails. Each receiver circuit is preferably tuned to a frequency different than the frequency of any alternating current found on the track rails. Thus, the application and removal of the coded currents on the track rails will produce transient voltages in the receivers having a natural period corresponding to their resonant frequency. In other words, the leading and trailing edges of each "on" period of coded current cause distinctive voltages to be induced in the corresponding receiver windings, and since the changes in current are simultaneous with respect to both rails, both receivers are affected alike and at the same time.

The two amplifying channels "A" and "B" are effective to provide simultaneous output voltages to the coincidence apparatus so that there is an output pulse to the decoding apparatus 31 for the beginning and end of each "on" period of the code.

On the other hand, if a distinctive voltage appears in one receiver and not the other, then its associated amplifying channel provides an output to the coincidence apparatus which is dissipated since the other amplifying channel has not coincidently supplied an output. In other words, both amplifying channels must simultaneously be controlled in order that the coincidence apparatus may be effective to supply an output to the decoding apparatus 31.

These transient voltages are produced in the receiving circuits for the leading and trailing edges of each "on" period of the code regardless of whether direct current, alternating current or rectified current is employed in the track section then associated with the receivers. Since the receiving circuits are tuned for a frequency different than any alternating current on the track rails, the apparatus can more readily distinguish between the transient voltages and any steady alternating current that may appear across the receiver coils. In addition, there is other apparatus associated with each amplifying channel which tends to suppress steady alternating voltages of the track current frequency. This is mentioned at this time merely to emphasize that one characteristic feature of the invention is the use of transient voltages that are produced in the receiving circuits for the leading and trailing edges of the "on" periods of the codes regardless of the particular character of track current then being employed.

The output pulses of the code detection and coincidence apparatus 30 are supplied to the decoding apparatus 31 as indicated in block form in Fig. 1 but which has been shown in detail in Figs. 8A, 8B, 8C and 8D. Although the decoding apparatus 31 shown as a part of the embodiment of the present invention is of that particular type which includes time gating features, it is to be understood that various kinds of decoding apparatus could be employed in connection with the code detection apparatus shown and briefly described above. However, for the purposes of the present invention, the decoding apparatus 31 includes among other elements, three code rate discriminators, one for each of the different predetermined code rates employed along the trackway. The output of each discriminator, when its particular code is being received, is supplied to relay control apparatus 32 which, in turn, governs the indication of a corresponding cab signal 33. The manner in which the different code rate discriminators are connected with the relay control apparatus is shown in the block diagram of Fig. 3.

For the purposes of a general understanding of the system, it is only necessary to appreciate that the decoding apparatus includes a plurality of timers which are able to distinguish between the different code rates by reason of their measuring times characteristic of such code rates so that when the output pulses of the coincidence apparatus occur at one of the predetermined code rates, a proper output is supplied to a control relay to energize the corresponding cab signal.

There are certain conditions under which the coincidence apparatus may supply a number of output pulses during the "on" period of the track current when alternating currents are employed. These various conditions will not be discussed at this time, but are merely mentioned so that it will be appreciated that the decoding apparatus includes circuit elements for taking care of such conditions in such a manner that the codes are properly decoded.

*Trackway apparatus*

Figure 2:
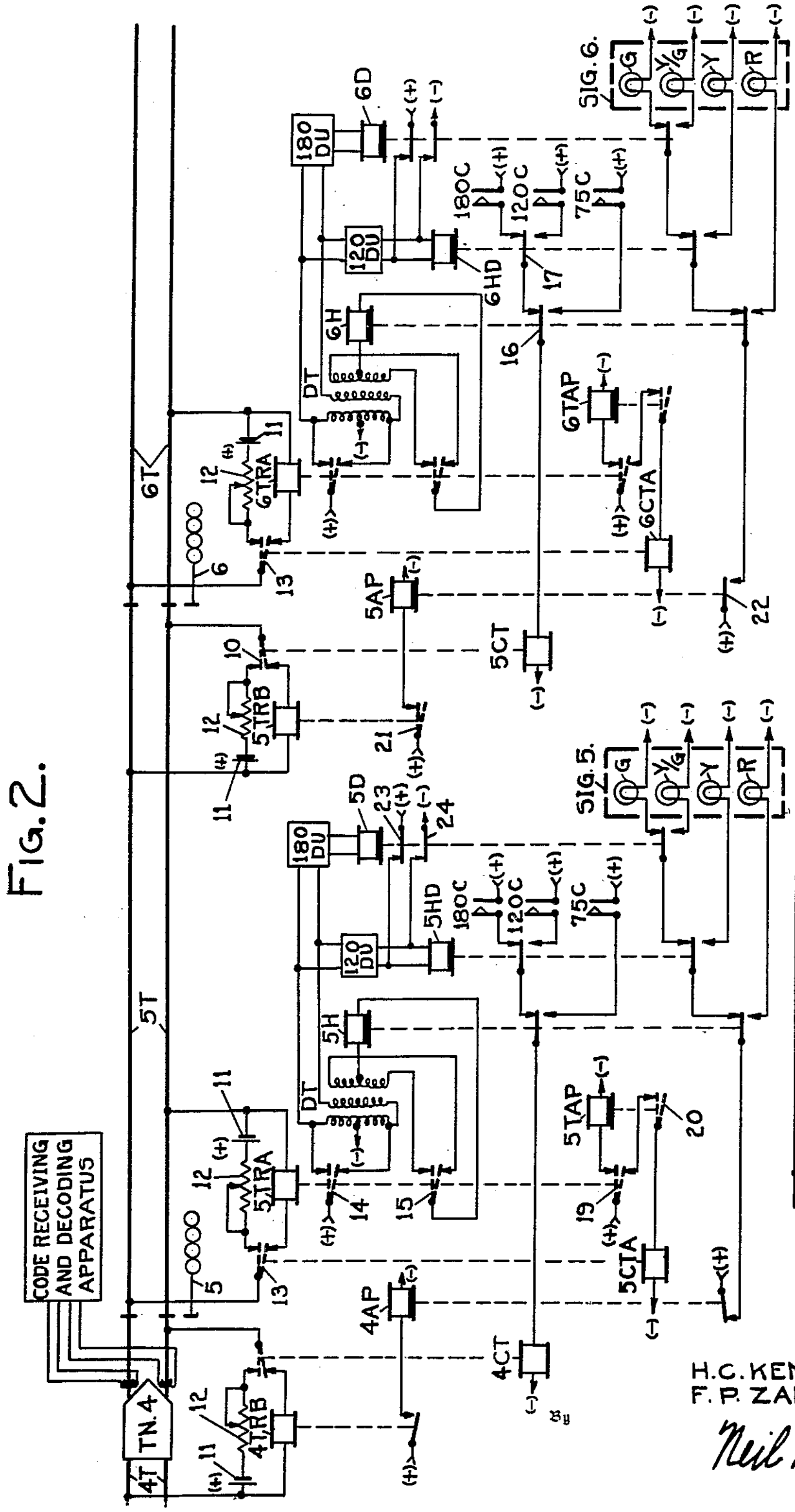
Fig. 2 shows in a diagrammatic manner a portion of a typical wayside signalling system of the coded direct current type with which the vehicle-carried apparatus of the present invention is adapted to cooperate.

The wayside signalling apparatus for the coded track circuits as generally discussed above has been shown in detail in Fig. 2 of the drawings. The illustration shows a stretch of track including a portion of a track section 4T, a track section 5T, and a portion of the track section 6T. The circuits are arranged for governing eastbound traffic corresponding to traffic movements to the right in the drawings, and signals 5 and 6 are provided at the entrance to track sections 5T and 6T respectively. A train TN is shown in Fig. 2 as being in approach to signal 5, and this train is indicated as carrying code receiving and decoding apparatus inductively associated with the track rails of the stretch. This apparatus is constructed in accordance with the present invention as disclosed in detail in other portions of the drawings and specification.

Although the vehicle-carried apparatus of the cab signalling system responds only to the driven codes in advance of the vehicle, the wayside apparatus of Fig. 2 also illustrates how inverse codes may be employed for approach lighting the signals. This particular organization of Fig. 2 is, of course, to be understood as merely typical of such a system, since various different kinds of apparatus and circuit arrangements could be employed and still accomplish the same general purposes.

More specifically, at each end of each track section (see Fig. 2), a contact of a code transmitting relay selectively connects either a winding of a track relay or a track battery across the track rails of the associated track section. For example, at the right-hand end of track section 5T, the back contact 10 of relay 5CT normally connects the winding of track relay 5TRB across the rails of track section 5T. When the transmitting relay 5CT is picked up, it closes a circuit through front contact 10 to the track rails including the track battery 11 and a current-limiting resistor 12 in series. A similar circuit arrangement is provided at the entrance end of the track section 5T except that the selection is made by contact 13 of the inverse code transmitting relay 5CTA.

At each signal location, the track relay, such as relay 5TRA, operates its contacts 14 and 15 in response to the reception of coded current to act through a decoding transformer DT to control the energization of the relay 5H. Whenever a code of any rate is being received, the relay 5H is energized; but whenever no code is being received, the relay 5H is deenergized.

Also, the decoding transformer DT is connected to the decoding unit 180DU and the decoding unit 120DU. These decoding units are shown in block form, but are to be understood as representing the conventional decoding type of unit including a tuned circuit and a rectifying unit. Thus, the unit 180DU supplies sufficient energy to pick up the relay 5D only when a code of the 180 rate is being received. Similarly, the decoding unit 120DU supplies sufficient energy to pick up the relay 5HD only when a code of the 120 rate is being received. However, an auxiliary circuit including contacts 23 and 24 of relay 5D, supplies pick-up energy for relay 5HD when a 180 code rate is being received.

The driven code transmitting relay 5CT, for example, is caused to operate at a code rate dependent upon traffic conditions in the track section 6T as indicated by the condition of energization of the relays 6H and 6HD. When a train is in the track section 6T, both the relays 6H and 6HD are deenergized and back contact 16 closes a circuit to the coder 75C to cause the transmitting relay 5CT to be operated at the 75 code rate. When the train has moved out of the track section 6T into the next track section 7T (not shown), the relay 6H is picked up but the relay 6HD is dropped away because a 75 code is then being received. Thus, the front contact 16 is closed and the back contact 17 is closed so that the code transmitting relay 5CT is energized by the intermittent operation of the coder 120C at the 120 rate. When the train has passed from the track section 7T (not shown) to the track section 8T (not shown) then a 120 rate is received which causes both relays 6H and 6HD to be picked up closing a circuit to the coder 180C which is operating at the 180 code rate. Also, when the train has moved into the track section 9T (not shown) or further along through the track stretch, the 180 code rate is received so that the relays 6H and 6D are both picked up by coded energy while the relay 6HD is held picked up by its auxiliary circuit controlled by relay 6D. This causes the relay 5CT to be connected through front contacts 16 and 17 to the coder 180C so that it continues to operate at the 180 code rate.

At the entrance end of the track section 5T, the operation of the track relay 5TRA in response to the different code rates not only actuates the relays 5H, 5HD and 5D in accordance with the rate of the code being received, but each time the track relay 5TRA is picked up, it closes front contact 19 to energize the relay 5TAP. Each time the track relay 5TRA drops away, a circuit is closed through its back contact 19 and front contact 20 of relay 5TAP to momentarily energize the relay 5CTA. This circuit is completed for only a short time during the release of the relay 5TAP which is sufficiently short that the "on" period of the inverse code thus applied to the track rails of section 5T by the momentary picking up of relay 5CTA is short enough to fit into the "off" period of the fastest driven code.

The inverse coded current is received at the opposite end of the track section 5T by the track relay 5TRB so that its contact 21 intermittently closes to energize the approach relay 5AP. This relay 5AP is sufficiently slow releasing in its characteristics as to remain picked up during the reception of an inverse code; but, when a train enters the track section 5T and interrupts the inverse code, the relay 5AP releases and closes back contact 22 to approach light the signal 6. In this way the inverse code provides for the approach lighting of the wayside signals in the usual manner.

From the above explanation, it will understood that the application of the driven codes to a track circuit by the operation of the code transmitting relay, such as relay 5CT, causes direct-current "on" periods to exist in the track circuit separated by spaced "off" periods. Usually these "off" and "on" periods are of substantially equal duration, although this may be varied slightly to compensate for track circuit characteristics to provide that the track relay 5TRA, for example, is operated uniformly. Such adjustment of the "on" and "off" periods in relative length is sometimes desirable because the resonant decoding units are more effective when the associated track relay is operated uniformly. When the operation of the transmitting relay 5CT, for example, is adjusted to give relative "on" and "off" periods resulting in uniform operation of the track relay, there may be a distortion of the code in the track circuit and this distortion will be received by the vehicle carried apparatus. However, this distortion will not effect any improper operation of the cab signalling system of the present invention for reasons which will be discussed in detail hereinafter.

Figure 2A:
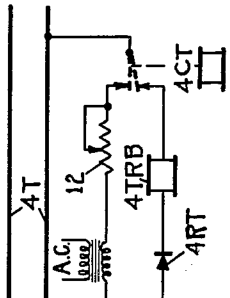
Fig. 2A shows how the code applying apparatus at each end of a track circuit as shown in Fig. 2 may be modified to use coded alternating current both for the wayside signals and for the cooperating vehicle-carried cab signals.

As previously mentioned, different portions of a railroad may have different kinds of coded track current. For example, the track batteries 11 may be replaced by a source of alternating current as shown in the modification of Fig. 2A. When this is done, it is desirable to include in series with each track relay a rectifier unit RT, so that the track relay will respond to the coded current. The same limiting resistor 12 is employed. In this way, Fig. 2 may be modified as shown in Fig. 2A to provide for the use of coded alternating currents in the track rails. The operation of the remaining apparatus is exactly as shown in Fig. 2.

In some instances, it may be desirable to employ coded rectified alternating current. This may be done by placing the rectifier unit in series with the source of alternating track current and the limiting resistor rather than in series with the track relay. Such a system has been disclosed in the Rees Patent No. 2,353,930, dated July 18, 1944. If desired, a full-wave rectifier can be employed by connecting the secondary of the alternating-current track transformer to the input to the rectifier and by connecting the output of such rectifier in series with the limiting resistor 12.

In brief, Fig. 2 illustrates the necessary wayside equipment to provide a wayside signalling system operative by coded track circuits, and these coded track circuits may use any one of several different kinds of current. These different kinds include the direct current as shown in Fig. 2, alternating current as shown in the modification of Fig. 2A, or rectified alternating current as mentioned above.

*Vehicle-carried apparatus*

Figure 5:
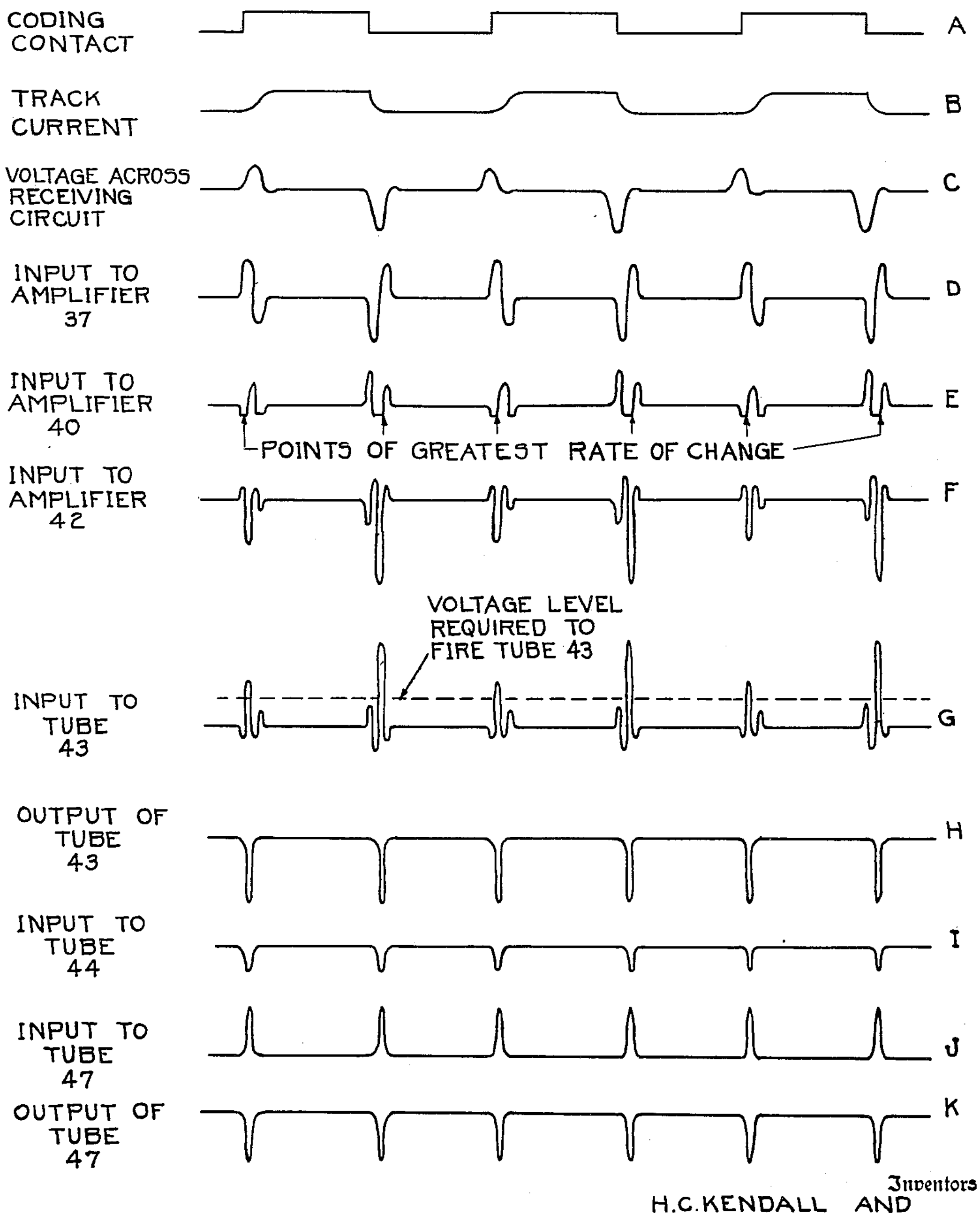
Fig. 5 shows in a general manner, without regard to exact values, various waveforms which may be present in the code detection and coincidence apparatus when the cab signalling system is passing over sections of track having coded direct current in the track rails.
Figure 7:
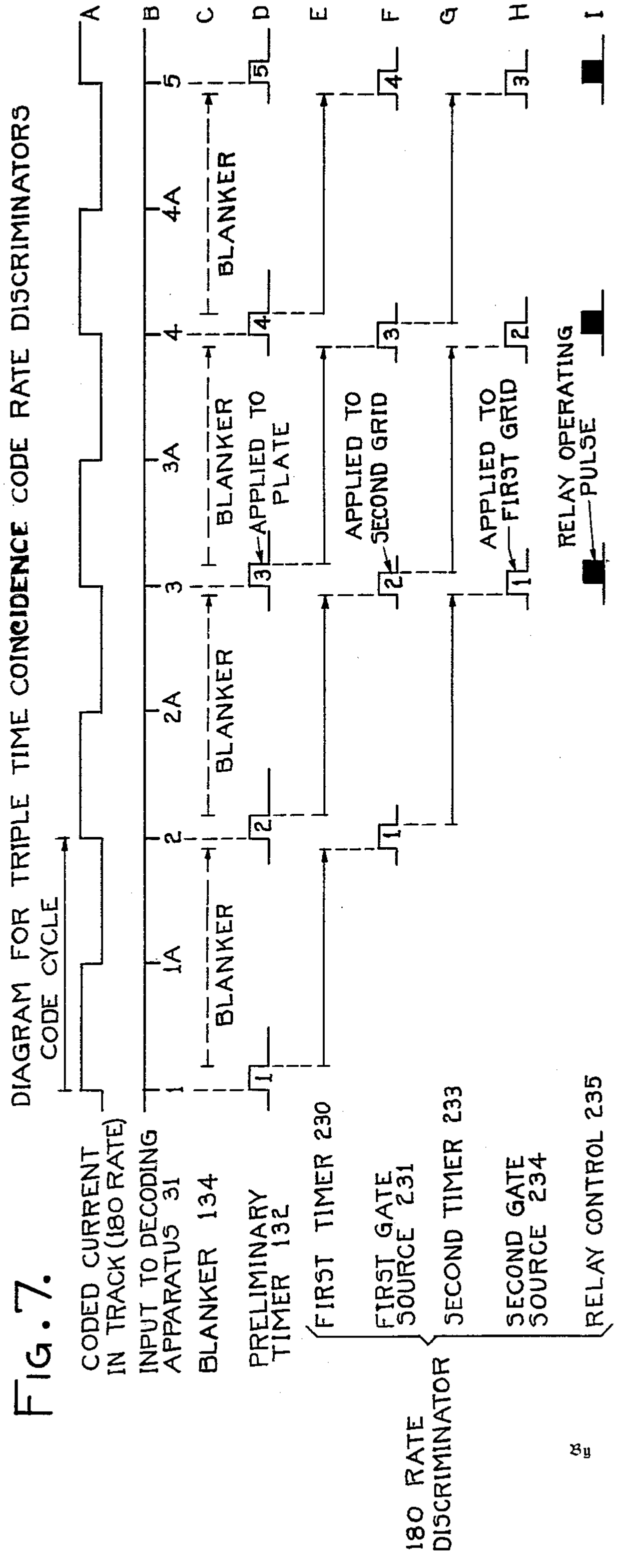
Fig. 7 is a sequence diagram of a typical operation of a triple time coincidence code rate discriminator as used in the cab signaling system of the present invention and shown in detail in Figs. 8A, 8B, 8C and 8D.

As already pointed out in a general manner, the vehicle-carried equipment includes a pair of receivers 29 providing the input voltages to the code detection and coincidence apparatus 30. This apparatus 30 provides output pulses to the decoding apparatus 31 which controls the relay control devices 32 to govern the cab signals 33. The general functions of these units have been mentioned in connection with the general block diagram of the system shown in Fig. 1. However, before discussing the detailed structure and circuit organization, it is believed expedient to consider the more detailed elements of the system as shown in the block diagram of Fig. 3. It is especially desired to point out the general functions of the different elements in connection with typical waveforms and timing charts, especially considering for the present the operation for coded direct current in the track rails. For example, Fig. 5 illustrates typical waveforms without regard to quantitative values that may occur in the code detection and coincidence apparatus 30 when the vehicle-carried apparatus responds to coded direct current in the track rails. Similarly, Fig. 7 shows a sequence of operations with respect to a code rate discriminator involving triple time coincidence.

Figure 3:
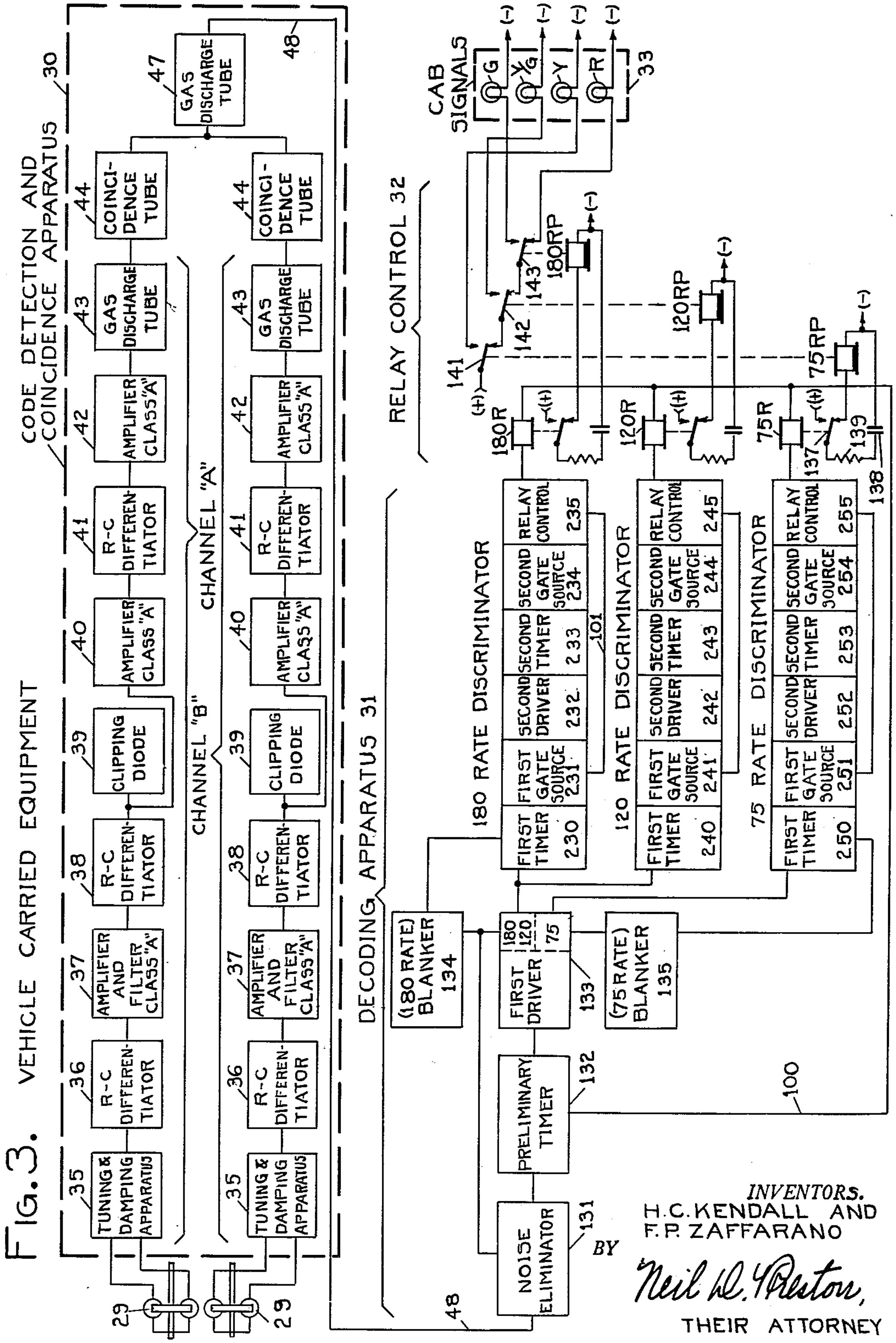
Fig. 3 shows in block form the vehicle-carried apparatus of the cab signalling system of the present invention.

Referring to Fig. 3, the code detection and coincidence apparatus 30 is indicated as having two amplifying channels "A" and "B," each connected to its respective one of the receivers 29 inductively related to the two track rails. These receivers are so positioned with respect to the track rails that a voltage is induced in them by the varying magnetic field as the track current is coded. The respective receivers are preferably so connected relative to each other and their respective amplifying channels that a change in track current will provide distinctive voltages of the same polarity at the input to the respective channels.

With reference to Fig. 5, the line A represents the operation of a coding contact along the track which applies and removes the track current. Because of the track circuit characteristics the rise and fall of current in the track may take place somewhat as indicated in line B of this Fig. 5. Obviously, the distributed inductance, capacitance, and resistance of the track circuit so affects the rise and fall of track current that the wave shapes will be different at different points in the track circuit. Thus, no exact showing of waveforms can be given.

The receivers 29 are connected to their respective tuning and damping apparatus 35 so that the receiving circuit is tuned to some particular frequency. Thus, the current changes in the track rails occurring upon the beginning and end of each "on" period of the track current produce distinctive voltages across the receivers as shown in line C of Fig. 5. Since the tuning and damping apparatus 35 includes a condenser in multiple with the receiver coils, each current change produced in the track rails causes a shock excitation of the windings of the receiver so that a series of oscillations occurring at a rate corresponding to the resonant frequency of the tuned coils would ordinarily be produced. For this reason, the damping means which comprise a resistor shunting the tuned coils is provided. For the purposes of the present disclosure, it is assumed that the value of this resistor is chosen so as to produce approximately what is known as critical damping, although this should not be considered as an essential feature of the present invention. In view of the damping, substantially all of the oscillations occurring as a result of each shock excitation are thus eliminated or damped so that what remains is a distinctive voltage swing or pulse for the first half cycle of the transient voltage thus induced. When coded direct current is used in the track, this distinctive transient voltage is of one polarity when current is applied to the track rails and is of the opposite polarity when track current is removed from the track rails as indicated in line C of Fig. 5.

This voltage thus appearing across the tuned receiving circuit is passed through an R-C differentiator 36 to the input of an amplifier and filter 37. The R-C differentiator 36 acts upon the input voltages to produce half cycles of alternating current of opposite polarity somewhat as indicated in line D of Fig. 5. Since the amplifier and filter 37 is preferably operated as a Class "A" amplifier, the output of the amplifier is merely of greater amplitude, but such output is passed through another R-C differentiator 38 to the input of another amplifier 40. This connection also includes a clipping diode 39 which is effective to remove the negative swings of such input, so that the input to the amplifier 40 is somewhat as shown in line E of Fig. 5.

The result of this clipping and differentiating is to supply a voltage to the amplifier 40 which is substantially a function of the rate of change of the voltage applied to the R-C differentiator 38 with the exception that the negative half cycles are substantially eliminated by the clipping action to thus produce a sharp rate of change of the voltage waveform at the instant the clipping diode 38 terminates its clipping effect and the voltage again rises to a positive value. The result of this can be seen by reference to line F of Fig. 5, where it will be noted that the sharp rate of change produces wide swings of voltage.

The resultant clipped input of line E is amplified by amplifier 40 where it is inverted and applied to the R-C differentiator 41. This differentiator 41 responds to the sharp rate of change in the output of amplifier 40 which has been caused by the clipping action by supplying a voltage to the amplifier 42 as shown in line F.

This input to the amplifier 42 is inverted by the amplifier and applied to the grid of the gas discharge tube 43. The large voltage swing appearing as a pulse of positive polarity on the control grid of the gas discharge tube 43 as indicated in line G of Fig. 5 renders such gas discharge tube conductive. The gas discharge tube 43 is normally nonconductive and is provided with a suitable quenching circuit organization so that it is rendered conductive only for a brief interval in a manner discussed in detail later. A gas discharge tube has the characteristic that once it becomes fired, it always conducts to the same extent regardless of the amplitude of the control voltage. For this reason, the effect of the gas discharge tube is to provide output pulses of uniform amplitude regardless of variations in the amplitude of its input voltages. This can be seen by comparing lines G and H of Fig. 5.

Each output of the gas tube 43 is a negative pulse somewhat as shown at line H of Fig. 5. This output pulse is applied to the concidence tube 44 through suitable coupling means so that its input is somewhat as shown in line I of Fig. 5.

As previously mentioned, the apparatus for channels A and B is exactly the same; and, the same current changes occur simultaneously in both rails in response to the coding operation. Thus, the gas tubes 43 of both channels provide an output pulse to their respective coincidence tubes 44 at the beginning and end of each "on" period as indicated in line I of Fig. 5. Each coincidence tube 44 acts to invert its input pulse to provide a positive output pulse. When both coincidence tubes 44 provide output pulses, the input to the gas tube 47 appears somewhat as indicated in line J of Fig. 5. The amplitude of each such positive pulse is sufficiently high to cause the gas tube 47 to be fired. As above mentioned, the firing of a gas tube causes it to become conductive to the same extent regardless of the particular value of the input voltage. Thus, the output of the gas discharge tube 47 is always the same for successive inputs regardless of slight variations in amplitude. The gas discharge tube 47 also has associated therewith suitable quenching or commutating means so that once the tube is fired, it is immediately extinguished after a short interval of time which is possible because the input pulse is of relatively short duration. In brief, the beginning and end of each "on" period of a code results in the gas discharge tube 47 giving a short negative output pulse somewhat as indicated in line K of Fig. 5.

On the other hand, if some disturbance is present in one rail and not the other so as to affect only one receiver, it is obvious that such disturbance will be amplified by the corresponding amplifying channel, and the tube 44 for that channel will supply an output pulse. However, if an output pulse is supplied by only one coincidence tube 44, that pulse is dissipated in the other tube 44 in such a manner as to be so reduced in amplitude that the gas discharge tube 47 cannot be fired, as will be fully described later. In this manner, extraneous disturbances in the track rails which do not occur simultaneously in both rails cannot produce a spurious response, since they are not effective to make the gas discharge tube 47 conductive to supply an output pulse to the decoding apparatus 31.

As briefly described above, the code detection and coincidence apparatus 30 is constructed to supply an output pulse of short duration for the beginning and end of each "on" period of a code for any of the customary code rates. This operation takes place for each of the different kinds of coded rail currents that may be used, although the above operation has been considered more particularly with respect to coded direct currents.

The supply of the pulses over the wire 48 to the decoding apparatus 31 sets such apparatus into operation to determine the particular code rate causing such pulses, as will be described in general with respect to Fig. 3.

Referring to Fig. 3, it will be noted that the decoding apparatus 31 includes a noise eliminator 131, a preliminary timer 132, a first driver 133, two blankers 134 and 135 and three code rate discriminators, one for each of the three different code rates employed. For example, the 180 rate discriminator includes a first timer 230, a first gate 231, a second driver 232, a second timer 233, a second gate 234, and a relay control 235. The 120 rate discriminator includes a similar group of elements numbered 240 through 245; while the 75 rate discriminator also includes a similar group of elements numbered 250 through 255. These various elements or devices with their circuit connections constituting the decoding apparatus 31 cooperate to effect an output by that particular code rate discriminator corresponding to the rate of the code then being received.

The output of the decoding apparatus 31 is then supplied to the relay control 32 which includes a relay for each different code rate. More specifically, relays 180R, 120R, and 75R are provided respectively for the corresponding code rate discriminators. Repeater relays 180RP, 120RP and 75RP are respectively associated with the relays 180R, 120R and 75R. Any particular repeater relay is picked up only if its corresponding control relay is repeatedly operated. For example, when the relay 75R is picked up, it closes front contact 137 to charge the condenser 138 through the resistor 139. When the relay 75R releases and closes its back contact 137, the charge on the condenser 138 is discharged through the relay 75RP. When this is done repeatedly, the relay 75RP is picked up and remains picked up so long as such operation continues. Each of the repeater relays is made slow releasing in its characteristics so as to maintain its contacts steadily picked up although its energization is intermittent.

When all of the repeater relays are deenergized, which is the case when no code is being received, the red lamp R of the cab signal 33 is energized from (+), through a circuit including back contact 141 of relay 75RP, back contact 142 of relay 120RP, back contact 143 of relay 180RP, lamp R, to (−).

When the relay 75RP is picked up, it completes an obvious energizing circuit through front contact 141 for the yellow lamp Y of the cab signals 33.

Likewise, when the relay 120RP is picked up, it closes an obvious energizing circuit through front contact 142 for the lamp Y/G of the cab signals 33.

Similarly, when the relay 180RP is picked up, it closes an obvious energizing circuit through front contact 143 for the lamp G of the cab signals 33.

In this way, the provision of three distinct rates of coded track current provides for four separate cab signal indications.

The manner in which the decoding apparatus 31 discriminates or distinctively responds to the different code rates is determined by the operation of timers which operate for times characteristic of the particular code rate to which they are to respond. These timers are included in the code rate discriminators and are governed by the input pulses which are supplied through the noise eliminator 131, preliminary timer 132 and first driver 133.

Essentially, the noise eliminator 131 is an electronic circuit organization acting as a timer which can be instantly set into operation and which normally restores within a relatively short interval of time. However, if such noise eliminator 131 receives a successive input prior to the lapse of the relatively short interval of time, its operation is continued. Thus, the noise eliminator 131 can be maintained in an operated condition throughout the time that inputs are supplied at intervals shorter than its timing operation. This characteristic of the noise eliminator 131 is for use in connection with the presence of alternating current in the track rails and under special conditions with coded direct current in the track rails, but these conditions need not be further considered at this time. Each time that the noise eliminator 131 is initiated into its timing operation, it supplies an output to the preliminary timer 132. The restoration of the noise eliminator 131 at the end of its timing interval does not affect the preliminary timer 132.

The preliminary timer 132 is an electronic circuit organization for measuring a relatively short interval of time following an input pulse after which it supplies an output pulse to the first driver 133. The purpose of the preliminary timer 132 is to provide restoration time for the code rate discriminators under certain circumstances which will be considered later. Upon the reception of an input from the noise eliminator 131, the preliminary timer 132 is immediately set into operation and an output is supplied to the first driver 133 after its short interval of operation.

The first driver 133 instantly provides output pulses to each of the first timers 230, 240 and 250. The purpose of the first driver 133 is to provide proper trigger pulses through two separate channels to the code rate discriminators. As indicated in Fig. 3, one channel is for the 180 and 120 code rate discriminators, while the other channel is for the 75 code rate discriminator. By providing these two separate channels certain blanking operations can be performed for the discriminators as later described.

For the purpose of considering how the code rate discriminators operate to provide the triple time coincidence feature, reference should be made to Fig. 7, in which the coded current in the track rails is indicated by "on" and "off" periods to comprise code cycles without regard to wave shapes and possible distortions (see line A). This diagram of Fig. 7 has been based on the 180 code rate so that reference may be made to definite elements of the decoding apparatus 31, but a similar operation applies to each of the code rates with respect to the other discriminators.

The detailed operations of the code detection and coincidence apparatus 30 have been omitted, merely showing in line B of Fig. 7 the presence of trigger pulses as the input to the decoding apparatus 31. These trigger pulses are, of course, relatively short and thus can be shown as substantially straight lines which have been designated as 1, 1A, 2, 2A, 3, 3A, 4, 4A, 5 and so forth. The trigger pulses occurring at code cycle intervals have been numbered in a sequence; whereas the trigger pulses occurring at the half cycle points have been given the same integer as the preceding pulse with an accompanying "A" to designate that such pulse belongs to a half cycle point. For convenience in the description, these trigger pulses at half cycle points may be termed intermediate pulses. Although the numbering of the pulses has been applied starting initially at the beginning of an "on" period it is, of course, possible that the actual response of the apparatus may begin at the end of an "off" period; and, in such a case the numbers would be applied in the same sequence but moved a half cycle to the right so as to belong to different leading and trailing edges of the coded periods in the track.

Since the noise eliminator 131 is an instantaneous repeater of an input pulse, it has not been indicated in Fig. 7; but it is assumed for simplification of the diagram that the input pulses to the decoding apparatus 31 directly initiate operation of the preliminary timer 132.

Assume, for example, that the preliminary timer 132 has completed its operation in response to an input so that it supplies an input to the first driver 133 which in turn supplies inputs to all three code rate discriminators. This input is indicated in Fig. 7 in line E as being applied to the first timer 230 which operates for a time interval characteristic of the 180 code rate. In this particular case, the timer 230 is shown as operating for an interval of time substantially corresponding to the time of a 180 code cycle except for the time required for the operation of the preliminary timer and the required margins for the gating operations as will be discussed later.

At the end of the timing operation of the first timer 230, it supplies an output to the first gate source 231 which operates during a short interval of time as indicated in line F of Fig. 7, and then supplies an output to the second driver 232 (see Fig. 3). This second driver instantly repeats the pulse to the second timer which initiates its timing operation for an interval of time similar to the time of the first timer (but not exactly the same) as shown in line G of Fig. 7. Upon the completion of its timing operation, the second timer 233 supplies an input to the second gate source 234 and its operates for a short interval of time as indicated in line H of Fig. 7. All of this happens as a result of the input pulse No. 1 supplied to the decoding apparatus 32 over wire 48. For this reason, the operating time of the preliminary timer 132, first gate source 231, and second gate source 234 in Fig. 7 has been designated by the number 1. It will also be observed that the No. 1 operation of the first gate source 231 occurs in overlapping relation to the No. 2 input, while the No. 1 operation of the second gate source 234 occurs in overlapping relation to the input No. 3.

Similarly, the pulse No. 2 causes the operation of the preliminary timer 132, the first timer 230, the first gate source 231, the second timer 233 and the second gate source 234. Such repeating operations are thus initiated for each succeeding input pulse of the series. It can thus be seen from the diagram of Fig. 7 that the operation of the second gate source for pulse No. 1 occurs at the same time that the operation of the first gate source 231 occurs for input pulse No. 2. These two gate sources are operated during corresponding intervals and in overlapping relation to the operation of the preliminary timer 132 for pulse No. 3. Since all three of these operations are in time coincidence the circuit organization effects the operation of the relay control 235. As a matter of fact, the relay control cannot be initiated until there are three time coincidences, one as a result of a first pulse, another as a result of a second pulse and another as a result of a third pulse with such spacing between the pulses as to correspond to a predetermined code rate.

The relay control 235 is effected by a gating circuit organization and involves the use of a gas tube. Referring to Fig. 3 it can be seen that the first gate source 231 can supply an output over wire 101 to the relay control 235 and if this takes place at the same time that the second gate source 234 supplies an output to the relay control 235, the preliminary timer 132 can then supply over wire 100 energy to complete the triple gating control for firing of the gas tube 235 included in the relay control. Since the gas tube once fired remains fired until energy is removed from its plate, the relay control 235 remains operated until the preliminary timer 132 has restored even though the first and second gates have ceased operation. For this reason, it will be seen that the relay control 235 is operated for short intervals of time as indicated in line I of Fig. 7. In other words, when input impulses to the decoding apparatus occur repeatedly at time intervals characteristic of a particular code rate, conditions of triple time coincidence are established for the code rate discriminator corresponding to that code rate so that upon the occurrence of each such triple time coincidence the relay control is operated for a short interval and effects energization of the corresponding relay.

In the above description, the intermediate pulses 1A, 2A, 3A and 4A have been neglected because the coding apparatus causes the blanker 134 to remove or blank out these intermediate pulses. This blanker 134 is operated throughout the time interval during which the first timer 230 is operating, and this blanker 134 is connected to the noise eliminator 131 in a manner to suppress the output from this device throughout the time being measured by the first timer 230. This operation for blanker 134 has been indicated in line C of Fig. 7.

Since the first timer 230 operates for an interval of time substantially corresponding to the code cycle time, it is evident that the first input to the decoding apparatus 31 over wire 48 results in the intitiation of the first timer 230, but its operation in turn acts through blanker 134 to render any subsequent inputs over wire 48 ineffective until the elapse of the time interval for the first timer. Referring to Fig. 7 it will be seen that this takes place just prior to the occurrence of input pulse No. 2. Thus, during the reception of a 180 code, the intermediate pulses are removed or blanked out so that the 180 code rate discriminator is caused to operate on output pulses from the code detection and coincidence apparatus 30 corresponding to the code cycle times. In addition to blanking out the intermediate pulses, the blanker 134 also prevents, while operating, any random pulses from being effective on all three code rate discriminators.

It will be noted by reference to Fig. 3 that the blanker 135 is controlled by the first timer 250 of the 75 rate discriminator. This blanker 135 is then made effective to act upon the first driver 133 only with respect to its output relating to the 75 rate discriminator. In other words, the intermediate and extraneous pulses of a 75 code are suppressed or blanked out by the blanker 135. It might be noted here that the 120 rate discriminator might also be provided with its own blanker for acting on its input from the first driver in which case the first driver would require an additional channel relating to the 120 rate discriminator. However, the blanker 134 operates for a sufficient time as measured by the first timer 230 to blank out the intermediate pulses for the 120 code rate. For this reason, the 120 rate discriminator does not require a blanker individual to it.

Although the above description is given more particularly with respect to the 180 rate discriminator, a similar operation occurs with respect to each of the discriminators which will be considered later in detail with more particular reference to Figs. 9A, 9B and 9C. It is thus believed that further description of the invention should be directed more particularly to the detail of structure and circuit organization shown in Figs. 4, 8A, 8B, 8C and 8D.

DETAIL STRUCTURE AND OPERATION OF VEHICLE-CARRIED EQUIPMENT

The complete circuit diagram of the vehicle-carried equipment is shown in Figs. 4, 8A, 8B, 8C, 8D and Fig. 3. The structure of the receivers is shown in detail in Fig. 1A. The pulse detection and coincidence apparatus 30 shown in Fig. 4 can be placed directly to the left of Fig. 8A so that its output connection will match the input to the decording apparatus 31. The decoding apparatus 31 is shown in detail in Figs. 8A–8D; but the relay control 32 is shown only in Fig. 3 as connected to the cab signals 33.

*Receivers*

As previously mentioned, the receivers 29 are mounted at the front of the vehicle in advance of any pilot wheels or any other structure that might shunt the track rails. Each receiver is preferably mounted on some suitable type of shock absorbing and damping means so as to prevent any undesired vibration of the receiver in the earth's magnetic field. Obviously, if the movement of the receiver is gradual the earth's magnetic field will have little or no effect. For this reason, the mounting structure should prevent any sharp shocks or vibrations to the receivers.

Each receiver 29 of Figs. 1, 2 and 3 is constructed as shown in detail in Fig. 1A to have a U-shaped iron core 50 and windings 51 and 52. The U-shaped core 50 is inverted as shown in Fig. 1A with the vertical legs of the receiver mounted on each side of the track rail 53. The two windings 51 and 52 are mounted on the vertical legs, and with such a relationship as to provide voltages which are additive for flux changes through the core structure due to current changes in the track rail. However, as previously mentioned, voltages which are induced in the two windings from an external magnetic field, such as the earth's magnetic field, which passes through the two vertical legs in the same direction, are in opposition so as to provide little or no output.

Both receivers 29, one for each rail, are constructed the same, and are preferably so connected relative to each other and to their respective input terminals of the code detection and coincidence apparatus 30 as to provide output voltages of the same polarity to the associated amplifying channels "A" and "B" upon corresponding changes in track current in the two rails, as, for example, at the beginning and end of an "on" period of a code cycle. This connection of the receivers to the respective amplifying channels, is preferably through a shielded cable to avoid picking up any external influences.

Since the receivers must be influenced by flux changes occurring upon the application and removal of direct current as well as alternating current, the receivers must be very efficient with a sufficient mass of iron and sufficient turns in the windings that an adequate input to the code detection and coincidence apparatus will be provided upon a change in current of as low as a half ampere of direct current. In this connection, it might be noted that coded track currents may vary between a half ampere and ten amperes depending upon track circuit conditions. However, effective practical operation is not warranted below approximately one half ampere so that construction of the receivers to be responsive to current changes between one-half and ten amperes is believed to be adequate for practical purposes. These values are not mentioned in any way in a limiting way, but merely as indicative of the field of practical utility in which the present invention is intended to operate.

*Code detection and coincidence apparatus*

With reference to Fig. 4 it can be seen that the windings 51 and 52 of each receiver are connected to their respective amplifying channel of the code detection and coincidence apparatus. Since both amplifying channels "A" and "B" are constructed exactly alike, it is believed that a detailed description of one will suffice for both. Also, it is assumed that coded direct current is being applied to the track rails, unless otherwise specified.

Fig. 4 shows that the windings 51 and 52 for the receiver associated with the upper rail are shunted by a condenser 65 and a resistor 66 connected in parallel to constitute thereby the tuning and damping apparatus 35 of Fig. 3. Although various values of these circuit elements 65 and 66 may be employed, it has been found in practice that a value of capacitance that will tune the receiver windings to a frequency of about 350 cycles per second and a value of resistance that will give approximately what is known as critical damping will produce the desired results. The application and removal of an "on" period of current in the track rails shock excites the tuned receiver circuit so as to produce a transient voltage at the beginning and end of each such "on" period, and each transient has a natural period corresponding to the resonant frequency of the tuned circuit. The voltage that is induced in the receiver windings is dependent upon the rate of change in the track rails so that with the substantial damping of the receiver windings a distinctive pulse appears across the receiving circuit at the beginning and end of each "on" period as previously described.

The transient voltages thus produced in the two receivers are applied to their respective amplifying channels. Referring to amplifying channel "A" of Fig. 4, the transient voltage is applied to the control grid of the amplifier 37 through capacitor 67. Also, a resistor 64 is provided to act as a grid leak for the control grid of tube 37. In addition, the values of the capacitor 67 and resistor 64 are so chosen as to constitute an R-C differentiator 36 so as to produce an alternating voltage on the control grid of tube 37 somewhat as shown in line D of Fig. 5. This voltage is amplified by the amplifier and filter 37 of Fig. 3 comprising tube 37 which has its plate voltage supplied from (B+), through a load resistor 54. This tube 37 has included in its cathode circuit a tuned L-C circuit including inductance 68 and capacitor 69. These components have values selected so as to provide a resonant circuit or filter which is tuned to some particular frequency which is desired to be suppressed. In such an event, the tuned circuit including inductance 68 and capacitor 69 is tuned to parallel resonance at that frequency so that it will act as a high impedance to this frequency alone. As a result, this tuned circuit will act degeneratively upon the amplifier with respect to such frequencies. For the purpose of this disclosure, it is assumed that this resonant circuit is tuned to the usual 60 cycle frequency. The direct-current ohmic resistance of the inductance 68 is of such a value as to properly bias the tube 37 to operate as a Class A amplifier.

With this arrangement, the application of a transient voltage to the tube 37 at the beginning and end of each "on" period of a code results in an output to the next component in the channel; but when the receivers pick up a 60 cycle alternating current voltage, this voltage is relatively ineffective both because of the tuning of the receiving circuit and also because of the resonant unit in the cathode circuit of tube 37, which resonant unit builds up a relatively high 60 cycle voltage which acts as a negative feedback on the grid of tube 37. In this way, the amplifier and filter combination adds to the effectiveness of the tuned receiving circuit to prevent the presence of foreign 60 cycle alternating current from affecting the proper response of the system to a direct-current code.

Also, this same action is effective when coded alternating current is applied to the track rails to discriminate between the transient voltages produced at the beginning and end of each "on" period of the code and any steady foreign alternating current found on the track rails.

The resultant voltage appearing at the plate of tube 37 is subjected to the action of another R-C differentiator 38 (see Fig. 3) which includes the condenser 72 and resistor 73 (see Fig. 4). The junction between the resistor and condenser is connected to the grid of the amplifying tube 40 and also to the cathode of a clipping diode 39 which has its plate connected directly to ground. Normally, the control grid of tube 40 is substantially at ground potential so that diode 39 cannot conduct. When the differentiated voltage from the plate of tube 37 appears on the grid of tube 40, this voltage would ordinarily go above and below ground potential, but the voltage is prevented from going below ground potential by the diode 39 which conducts when its cathode potential tends to go below that of ground. Consequently, the voltage appearing at the control grid of tube 40 has the negative half cycles clipped somewhat as shown in line E of Fig. 5, with the result that a sharp rate of change of this voltage occurs at those times when the voltage again rises after having been subjected to this clipping action. These points of most rapid rate of change have been indicated in connection with line E of Fig. 5.

The tube 40 has its plate connected to (B+), through a load resistor 76, and also has a cathode resistor 74 which provides a normal bias on the tube to cause it to operate as a Class A amplifier. The output of the tube 40 is passed through a capacitor 80 and potentiometer 81 to ground. The desired voltage drop across the resistor 81 is selected and applied to the control grid of the tube 42. Capacitor 80 and resistor 81 also act as an R-C differentiator with respect to the output voltage of the tube 40 and constitute the R-C differentiator 41 of Fig. 3. This R-C differentiator including capacitor 80 and resistor 81 responds to the rapid rate of change of the voltage appearing at the plate of tube 40 by providing a correspondingly large voltage variation at the control grid of amplifier tube 42. The voltage that appears at the control grid of tube 42 thus has approximately the waveshape shown at line F of Fig. 5. The amplifier tube 42 has its plate connected to (B+) through a load resistor 77 and also has a resistor 75 included in its cathode circuit to provide self bias for this tube so that it will operate at substantially Class A. Cathode resistors 74 and 75 of tubes 40 and 42 are not by-passed for the signal being amplified by these tubes. Although this arrangement produces some degeneration with respect to the input signal to each tube and so tends to reduce the over-all amplification, it does produce the desirable effect of making the amplifier more stable.

The input voltage to the tube 42 is amplified and applied through a coupling condenser 83 and grid-current-limiting resistor 84 to the control grid of the gas discharge tube 43. A negative voltage source is connected from (B−) through resistor 82 and resistor 84 to the control grid of this gas discharge tube 43 so that it is normally biased below cutoff to such a point as to require the desired amplitude output of amplifier 42 before this tube can conduct. The plate of this gas discharge tube 43 is connected to (B+), through the load resistor 90. The shield grid is directly connected to ground.

The voltage appearing on the control grid of tube 43 as a result of the transient produced at the beginning and end of each code "on" period is somewhat as shown in line G of Fig. 5. As indicated in Fig. 5, the relatively large swing of positive voltage on the grid of tube 43 raises it to such a positive value as to cause this tube 43 to be fired, and this relatively large positive voltage is caused by the rapid rate of change occurring as a result of the clipping action indicated at line E of Fig. 5. Under some circumstances the other voltage swings due to the transient voltages and the differentiating actions may also be sufficiently high to fire the tube, but the operation under these conditions will be considered separately.

A quenching condenser 98 is connected from the plate of tube 43 to ground. The purpose of this condenser is to provide a means for causing the gas discharge tube 43 to be restored to its normal non-conductive condition without requiring that the plate-cathode circuit be opened. When a gas discharge tube such as tube 43 becomes conductive, its plate voltage is reduced because of the voltage drop produced by the plate current flow through the load resistor. The load resistor 90 for tube 43 is chosen to be of a sufficiently large value so that the voltage that appears between plate and cathode of tube 43 when this tube is conductive is not sufficient to maintain this tube in a conductive condition. When tube 43 is non-conductive, condenser 98 is charged to the relatively high potential that exists between it and the plate of this tube 43. However, when tube 43 becomes conductive, this condenser 98 is rapidly discharged through the low resistance path provided by the conducting tube so that the plate voltage decreases very abruptly. When the plate voltage reaches the very low value as determined by the voltage drop produced by the plate current through resistor 90, the tube is momentarily extinguished. Consequently, the plate voltage tends to rise because of the cessation of plate current through the load resistor 90, but because condenser 98 is connected between the plate and ground, the rate of rise of the voltage is made relatively slow because of the long time constant involved in charging condenser 98 through the large plate resistor 90. As a result, the plate voltage is prevented from rising quickly for, if it were to do so, it would quickly rise to the ignition level of the tube prior to the time that must elapse before the tube can become deionized and the control grid regain control of the tube. By inclusion of the condenser 98, however, the rate of rise of the plate voltage up to the level where reignition would occur is sufficiently delayed to permit the tube to deionize so that grid control is restored. Thus, the connection of a condenser of suitable value between the plate of gas discharge tube 43 and its cathode and the provision of a suitably large resistor 90 makes it possible for the gas discharge tube 43 to be self-extinguishing when once made conductive.

The coincidence tube 44 has its place connected to (B+), through the load resistance 91 and its control grid is maintained at substantially zero potential by reason of the potential drop produced by the flow of a small value of grid current through resistors 87 and 89 also connected to (B+). The mid-point between resistors 87 and 89 is connected to the output of tube 43 through coupling capacitor 86. With these conditions established, tube 44 is normally conducting a plate current which produces a potential drop in its load resistor 91.

When tube 43 is made momentarily conductive, the potential drop produced across resistor 90 appears as a negative pulse somewhat as indicated in line H of Fig. 5. This negative pulse is applied to the grid of tube 44, and causes an abrupt negative swing of the grid of tube 44 so that this tube ceases to conduct for an instant and provides a positive output voltage. As previously mentioned, the channel "B" also includes a coincidence tube 44 connected in exactly the same way. Thus, if an output is produced by the coincidence tube 44 of channel "A" while the tube 44 of channel "B" is conducting then this positive output is merely dissipated through this other conducting tube 44. But if both tubes 44 are made non-conductive at the same time, then both supply positive output voltages which are effectively supplied through coupling condenser 94 and resistor 95 to the control grid of the gas discharge tube 47.

The gas tube 47 has its plate connected to (B+), through a load resistor 96 and its control grid is biased beyond cutoff by a connection to (B—) through resistor 97 and resistor 95. The shield grid and cathode of this tube are connected directly to ground. The plate is also connected to ground through the quenching condenser 99. Thus, when both tubes 44 become non-conductive and supply an output voltage somewhat as shown in line J of Fig. 5, as a result of a simultaneous change of current in both track rails, the control grid of this gas tube 47 is raised to a sufficiently positive value to cause the tube to conduct. Tube 47 conducts, its plate potential is abruptly decreased and condenser 99 discharges so that after a short interval the tube 47 again becomes non-conductive in a manner described in connection with tube 43. The lowering of the plate potential of tube 47 thus results in a negative output pulse which is applied to the decoding apparatus 31 over wire 48.

From the above description, it will be evident that the leading and trailing edges of each "on" period of coded direct rail current will produce a transient voltage in each channel of the code detection and coincidence apparatus at the same time so as to effectively provide an output on wire 48 for the decoding apparatus 31. On the other hand, if some extraneous influence causes an input to only one channel at a time, the output of the coincidence tube for that channel is dissipated by the coincidence tube in the other channel so that there is no effective output to the decoding apparatus.

Under some circumstances, the coded direct current in the track may be of such a high amplitude as to produce transient voltages of a higher amplitude than usual in which case there may be more than one effective input to the gas tubes 43 at the leading and trailing edges of each "on" period. Since the receivers are properly connected to provide corresponding polarity of input to each channel for each change in the track rails, these successive cycles of the transient are in coincidence so that the tube 47 supplies more than one output for each transient voltage thus produced. This is possible because the quenching condensers 98 and 99 and the related time constants are of such a value as to permit tubes 43 and 47 to become conductive in response to each of a series of rapidly occurring input pulses. However, the first output to the decoding apparatus for each transient voltage is the one which is effective to initiate the timing operations, and the successive outputs are absorbed by the noise eliminator 131 as later described.

It was previously pointed out that according to this disclosure it was preferable to employ critical damping by the resistor 66. Critical damping is not, however, an essential characteristic of the invention, since the provision of only slight damping would allow several transient cycles to act at the beginning and end of each code "on" period. These cycles would be in coincidence and would result in successive outputs by tube 47, but only the first output of each such series would initiate the timing operation, since the others would be absorbed by the noise eliminator. In such a case, it is, of course, assumed that sufficient damping would be employed so that the transient voltages produced at the beginning and end of each "on" period would not overlap with each other. Thus, the scope of the present invention is not limited to critical damping.

The preferred form of the invention employs substantially critical damping because it is desirable that the pulse detection and coincidence apparatus have a sensitivity that is independent of the track current polarity. For various reasons, some track circuits may be of one polarity while others may be of the opposite polarity, but it is desired that the apparatus have the same sensitivity for both polarities. The degree of damping of the tuned receiving circuits has been found to affect the relative amplitudes of the pulses supplied to the gas discharge tubes 43 as the track current polarity is reversed. Experiments show that when approximately critical damping is employed in the receiving circuits, substantially the same input pulse to the tubes 43 is provided for either polarity of track current. One possible explanation for this fact is that when approximately critical damping is used, both the leading and trailing edges of the first half cycle of each transient voltage induced in the receiving circuit (line C of Fig. 5) have substantially the same slope although of the opposite sign. The sharp rate of change produced by the clipping effect of the diode may occur at different times with respect to the pulse induced in the receiver coils depending upon the polarity of that pulse. Thus, the sharp rate of change occurs early with respect to the induced pulse when this pulse is of one polarity but occurs late when that pulse is of the opposite polarity. These variations in timing are illustrated by comparing lines C and E of Fig. 5. It may also be said that the sharp rate of change that is produced actually occurs as a result of differentiation and clipping in response to the leading edge of the pulse across the receivers when this pulse is of one polarity and as a result of differentiation and clipping in response to the trailing edge when the pulse is of opposite polarity. Thus, if substantially critical damping is employed so that both edges of this distinctive voltage induced in the receiver coils are of approximately the same slope, although of opposite sign, then both edges will be equally effective, upon being successively differentiated and clipped, to produce distinctive output pulses of equal amplitude to the control grids of tubes 43. In this way, the specified sensitivity will be more nearly independent of the track current polarity.

Figure 6:
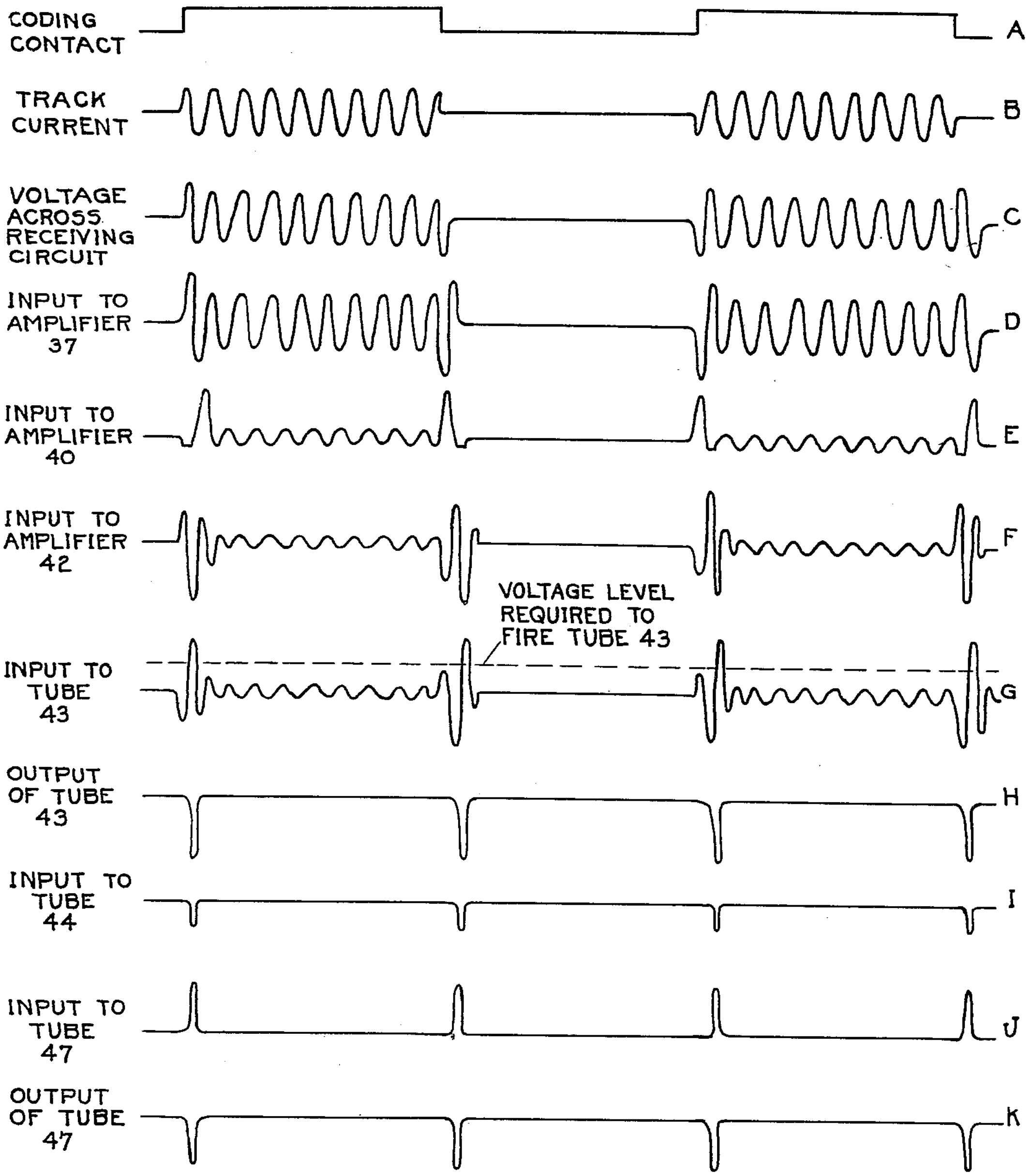
Fig. 6 shows in a general manner, without regard to exact values, various waveforms which may be present in the code detection and coincidence apparatus when the cab signalling system is passing over sections of track having coded alternating current in the track rails.

As previously mentioned, the system is operative on coded alternating current. This has been more particularly illustrated by the waveforms for the code detection and coincidence apparatus in Fig. 6 of the drawings. In line A of Fig. 6 is indicated the operation of a coding contact which applies and removes the alternating current on the track circuit so that track current flows somewhat as indicated in line B of Fig. 6. The receivers of the vehicle-carried apparatus thus have induced across their windings an alternating voltage for each "on" period of the trackway code. This has been indicated in line C of Fig. 6, and it will be observed that the beginning and end of each such "on" period is slightly distorted from the steady state alternating current waveform. This distortion is caused by the presence of a transient voltage the same as when coded direct current is employed. The tuning and damping, and differentiator action accentuates the distortion of the alternating current wave so that the input to tube 37 appears somewhat as indicated in line D of Fig. 6. In his connection, it should be noted that the resonant unit including inductance 68 and capacitor 69 is preferably tuned to the 60 cycle frequency assumed to be coded for the track current. Thus, the voltage which builds up across it acts as a negative feedback voltage to render the amplifier circuit organization degenerative with respect to this voltage so that the transient portion of the wave is amplified but the 60 cycle steady state wave is considerably attenuated. The output of this tube 37 is applied to the tube 40 through the capacitor 72 the same as previously described, and the clipping diode 39 is effective to remove any negative waves of substantial amplitude. Therefore, all that remains is the relatively high positive pulse at the beginning and end of the "on" period with 60 cycle alternating voltage of relatively small amplitude existing between such positive pulses somewhat as indicated in line E of Fig. 6.

The output of the amplifier tube 40 and the action of the differentiating circuit elements 80 and 81 is the same as previously described so as to produce an input to amplifier 42 somewhat as shown in line F of Fig. 6. This amplifier 42 amplifies and inverts the voltages and produces an input through the tube 43 which has positive waves of sufficient amplitude to fire the gas tube 43 somewhat as shown in line G of Fig. 6. With reference to Fig. 6, it will be seen that the output of gas tube 43 is the same as indicated in line H of Fig. 5, so that subsequent operation of the apparatus is exactly as described in connection with the response of the apparatus to coded direct current. This will be understood by comparing lines H, I, J and K of Figs. 5 and 6.

It was previously pointed out that the coded direct currents could be detected even in the presence of several amperes of foreign alternating current because the transient produced by the shock excitation of the tuned receiving circuit was distinguishable from the steady-state foreign alternating current. This is also true when coded alternating current of 60 cycles is employed because the induced voltages in the receiving circuit contain a transient component having a natural period sufficiently different from the steady 60 cycle induced voltage to make the transient distinguishable. In that event, the filtering apparatus, particularly the tuned L–C circuit in the cathode circuit of tube 37, attenuates the 60 cycle voltage markedly without appreciably affecting the transient. Consequently, the ratio of amplitudes of the transient with respect to the 60 cycle steady voltage is greatly increased.

At times, the coded alternating current on the track may be of such an amplitude as to cause the transients to be so strong at the beginning and end of each "on" period that more than one positive pulse is produced to fire the tubes 43, but this operation will be in coincidence since the condition will occur simultaneously in both rails. This condition will not unfavorably affect the operation of the system because, as previously mentioned, the noise eliminator 131 of the decoding apparatus provides that only the first pulse produced by the tubes 43 will be effective.

In some instances, the coded alternating currents may become of such high amplitude on the track rails as to make it impossible for the tuning and filtering action of the apparatus to attenuate the steady-state alternating current during the "on" period so that the tubes 43 fire for each cycle throughout the "on" period. Since these voltages are in coincidence, the tube 47 will, of course, supply an output over wire 48 each time that tubes 43 are fired, but again the noise eliminator 131 is effective to supply an output to the timing apparatus only for the first pulse in a rapidly occurring series received by it.

The system is also operative if coded alternating current of 100 cycles is used because the application and removal of the coded alternating current provides transients in the receiving circuit the same as does the application and removal of the 60 cycle coded alternating current. Although the receiving circuit is tuned to a frequency different than the coded alternating current, this may not provide sufficient attenuation of the alternating current during the "on" periods. The amplifier and filter unit 37 cannot act degeneratively with respect to the 100 cycle if the filter is tuned to 100 cycles. Thus, each cycle as well as the transient pulses at the beginning and end of an "on" period may be effective to cause an output of the gas tube 47. This difficulty is also overcome by the noise eliminator so that the timing operation is initiated only upon the reception of the first pulse at the beginning of each "on" period.

On the other hand, if desired, another resonant unit, tuned to the 100 cycle frequency, may be included in the cathode circuit of the amplifier 37 in series with the resonant unit tuned to the 60 cycle frequency. This arrangement has been illustrated in the modification of Fig. 12 where the same circuit elements are shown as in Fig. 4 but in addition the inductance 78 and capacitance 79 are connected in parallel and tuned to the 100 cycle frequency. The action of this additional filtering unit in connection with the reception of 100 cycles is the same as described in connection with the resonant unit including inductance 68 and capacitance 69. More particularly, it will serve to reduce the amplitude of the steady state, 100 cycle alternating voltage on the control grid of amplifier tube 40, somewhat as indicated in line E of Fig. 6.

*Decoding apparatus*

As previously described, the presence of a code on the track rails results in an output from the code detection and coincidence apparatus over wire 48 for the beginning and end of each "on" period. These pulses thus occur at a rate depending upon the rate of code then being applied to the track rails. In the present disclosure, three different rates are employed so as to provide for four separate signal indications both for the wayside signals and the cab signals.

*Noise eliminator*

The output of the code detection and coincidence apparatus is in the form of negative trigger pulses which are applied through a coupling capacitor 151 to the noise eliminator 131. The noise eliminator includes a diode 150 which has its plate connected to (B+), through a load resistor 155, and its cathode is connected to ground through a resistor 152. The noise eliminator also includes a triode 153 which has its plate connected to (B+), through the load resistor 176, and its cathode is connected directly to ground. Its control grid is connected to (B+), through the load resistor 155 associated with the diode 150 so that the control grid is held at approximately zero potential with respect to ground because of the flow of a small grid current. The plate of tube 153 is connected to ground through capacitor 178.

The noise eliminator also includes a gas discharge tube having its plate connected to (B+) through a load resistor 177 and its cathode connected directly to ground. Its control grid is connected to the plate of tube 153 through coupling condenser 156 and resistor 158 and also to (B−) through resistors 158 and 159 so that this grid is biased to a voltage to make this tube normally non-conductive. The gas tube 157 has its output connected through coupling capacitor 164 to the preliminary timer and its plate is also connected through capacitor 163 to ground. The shield grid of this gas tube 157 is connected to (B−) through resistor 160 and through resistor 161 to bus 162. Normally, a positive voltage appears on bus 162 so that the resulting shield grid-cathode potential allows tube 157 to become conductive if the control grid-cathode potential is sufficiently raised above its normal negative value. However, a blanking operation may be performed, as will presently be described in greater detail, which so lowers the voltage on bus 162 that the resulting shield grid-cathode potential prevents the conduction of tube 157 even though its control grid potential is driven above its normal negative level.

Essentially, the noise eliminator is a form of delay circuit or electronic timer which is instantly set into operation upon receiving an input pulse and which restores itself to its normal condition after a short interval unless a following input is supplied before such restoration. Such an input would, of course, maintain the timing operation in progress. More specifically, the plate of diode 150 is normally held at about ground potential corresponding to the potential of the cathode of triode 153, because any tendency of the control grid potential of tube 153 to rise results in a grid current through resistor 155. Under this condition, the condenser 154 is practically unchanged. When a negative input pulse is received through the coupling capacitor 151 and applied to the cathode of tube 150, the plate of the diode 150 is abruptly reduced below ground potential and a negative charge is placed on the capacitor 154. Because of the short time constant of the circuit for charging the capacitor 154 through the diode 150, this capacitor charges very rapidly but when the negative pulse disappears from the cathode of the diode 150, the capacitor 154 can discharge very slowly only through resistor 155. The values of capacitor 154 and resistance 155 are so chosen that capacitor 154 will not discharge sufficiently between successive input pulses arriving at a rate substantially faster than the 180 code rate. Therefore, the capacitor 154 remains negatively charged and thus holds the grid potential of tube 153 at such a negative value that this tube is not permitted to conduct. Consequently, when negative pulses are applied to the noise eliminator 131 at a relatively fast rate as may happen when the coded alternating current is of relatively high amplitudes, the plate of diode 150 remains below ground potential and rises toward ground only when such input pulses cease. With tube 153 continually cut off during such a time, the voltage at the plate of this tube remains substantially constant and at a high level.

When tube 153 is abruptly made non-conductive upon the initial reception of the negative pulse by the diode 150, tube 153 supplies a positive output pulse through capacitor 156 to the control grid of the gas tube 157. Assuming that a positive voltage is being applied to bus 162 so that the shield grid of tube 157 is not blanked, this positive pulse in the grid of tube 157 causes this tube to become conductive. As a result, a negative pulse is supplied to the preliminary timer from the plate of tube 157 through the coupling capacitor 164. In other words, as soon as the negative input is supplied to the noise eliminator a negative output pulse is immediately supplied to the preliminary timer. This output is a relatively short pulse, because the quenching capacitor 163 causes the tube 157 to become non-conductive after a very short interval of time.

However, with tube 153 continually cut off during the reception of rapidly occurring (faster than 180 rate) successive inputs, no change in voltage is experienced at the plate of this tube 153 during an "on" period of alternating current under the conditions where each successive cycle causes a successive input to the noise eliminator. Under these conditions, the voltage at the plate of tube 153 changes only at the beginning of an "on" period of track code when the capacitor 154 is first negatively charged and again at the end of each "on" period when this capacitor again discharges. However, when the tube 153 again conducts, the output of the plate is a negative pulse which does not affect the negatively biased control grid of the gas tube 157. Spurious voltage variations at the plate of tube 153 occurring at a rapid rate cannot appreciably affect the grid voltage of tube 157 because they are by-passed to ground through condenser 178.

*Preliminary timer*

The preliminary timer 132 shown in Fig. 8A comprises an electronic timer and a cathode follower. The timer begins its timing operation in response to each initiation of timing by the noise eliminator 131. This timed interval is relatively short as compared to the cycle time of the most rapid code rate. During this interval timed by the preliminary timer, the associated cathode follower supplies a positive voltage over wire 174 and through the windings of the various relays controlled by the respective code rate discriminators to the gas discharge tubes included in the relay control units such as the relay control 235 associated with the 180 rate code discriminator. Also, at the end of the interval timed by the preliminary timer, a control voltage is supplied over wire 219 to the first driver 133 which is effective to initiate the operation of this apparatus.

The preliminary timer 132 includes a diode 166 and a triode tube 167 which are connected together to form a timing circuit similar to the corresponding electronic timer included in the noise eliminator 131 comprising tubes 150 and 153. In addition, the preliminary timer 132 includes a triode tube 172.

The input to the preliminary timer 132 is obtained from the plate of tube 157 and is applied through condenser 164 to the cathode of diode 166. The plate of diode 166 is connected through a resistor 169 to the (B+) source of power, and the cathode is connected through resistor 165 to ground. The plate of this diode 166 is connected directly to the control grid of tube 167 and also through condenser 168 to ground. The plate of tube 167 is connected through load resistor 175 to (B+) and through the by-pass condenser 179 to ground. The output of tube 167 obtained from its plate is applied through resistor 170 to the control grid of tube 172, and also is applied over wire 219 and through condenser 180 and resistor 182 to the control grid of tube 183 included in the first driver 133. Tube 172 is connected to operate as a cathode follower having an output resistor 173 included in its cathode circuit. With tube 167 normally conducting, its plate voltage is relatively low so that the voltage divider for resistors 170 and 171 which are connected between the plate of this tube and (B−) provide, at the junction of these two resistors a cutoff voltage for the tube 172. The output voltage appearing across this resistor when tube 173 is made conductive is applied over wire 174 to a terminal of each of the relays 180R, 120R, and 75R shown in Fig. 8B.

For reasons which were explained in connection with the description of the similar electronic timer included in the noise eliminator 131, both the cathode and plate of diode 166 are approximately at ground potential. Consequently, an increase of potential occurring at the plate of tube 157 in the noise eliminator 131 is not effective upon the electronic timer included in the preliminary timer 132 because an increase of cathode potential of diode 166 results in a negative plate-cathode voltage which prevents the conduction of this diode. However, when the gas tube 157 is made conductive upon the occurrence of the first of a series of rapidly occurring input pulses to the noise eliminator 131, the negative voltage pulse that results at the plate of this gas tube causes a decrease of cathode voltage for diode 166 so that this diode conducts and charges condenser 168. Following the termination of the negative pulse obtained from the plate of tube 157, condenser 168 slowly discharges through resistor 169 to thereby time the desired interval. This interval is relatively short as compared to the cycle time of the fastest or 180 code rate, as has been mentioned. In one embodiment of this invention, the interval timed by this electronic timing circuit was chosen to be 60 milliseconds at the beginning of the timed interval, the grid cathode voltage of tube 167 is driven beyond cutoff and this tube maintained in a non-conductive condition throughout the timed interval by the negative charge across condenser 168. Thus, an abrupt increase of voltage appears on wire 219 which supplies an input to the first driver 133, and an increase of voltage is also experienced on the grid of cathode follower tube 172. When tube 167 is in its normal conducting condition, the voltage divider provided by resistor 175, 170 and 171 connected between (B+) and (B—) produces a cut-off voltage for tube 172. However, when tube 167 becomes non-conductive, its plate voltage is raised sufficiently so that the voltage at the grid of tube 172 is raised to the level to permit this tube to conduct. Thus, whereas the voltage at the cathode of tube 172 and applied over wire 174 is normally at ground potential because of the non-conduction of this tube, this voltage is increased to some positive level during the interval timed by the preliminary timer.

*First driver*

The first driver 133 includes two gas discharge tubes 187 and 188 which, when made momentarily conductive, supply negative output pulses to the various code rate discriminators. The output pulses provided by tube 187 control the operation of the first timer 230 and 240 associated respectively with the 180 and 120 code rate discriminators; whereas, the gas tube 188 controls the first timer 250 associated with the 75 rate code discriminator. These two gas discharge tubes 187 and 188 receive positive input pulses to their control grids from the plate of triode tube 183 which, in turn, is controlled by the voltage obtained from the plate of tube 167 included in the preliminary timer 132. The circuit arrangement with respect to tube 183 is in response only to decreases in the plate voltage of tube 167. When such a voltage decrease does occur, a positive voltage is applied to the control grids of both tubes 187 and 188. Since a decrease of voltage at a plate of tube 167 is experienced only at the end of the interval timed by the preliminary timer 132, it may be said that a voltage of the proper polarity to make the gas discharge tubes 187 and 188 conductive is supplied by the output of tube 183 only at the end of each such interval timed by the preliminary timer.

More specifically, tube 183 has its plate connected through a load resistor 222 to (B+), and its control grid is connected through resistors 182 and 181 to the (B+) power source also. Despite the connection of this grid through these resistors to a positive source of voltage, the grid-cathode potential of tube 183 is approximately zero volts since any tendency of the grid voltage to rise appreciably above that of the cathode results in an increased grid current flow which tends to decrease the grid potential. Upon the initiation of the interval timed by the preliminary timer 132, the plate voltage of tube 167 is abruptly increased, but this increase of potential on wire 219 has no appreciable effect upon the plate current of tube 183 because it causes an increase in the grid current which then produces a corresponding increase in the potential drop across resistor 182 so as to maintain approximately the same grid-cathode voltage. However, at the end of the interval timed by the preliminary timer 132, the plate voltage of tube 167 is abruptly decreased. The discharge of condenser 180 that then occurs causes the grid-cathode voltage of tube 183 to be driven substantially negative, beyond cutoff, so that the plate voltage of this tube is immediately increased. The plate of tube 183 is connected through the coupling condenser 184 to the control grids of both gas discharge tubes 187 and 188. The control grids of both these tubes are connected through respective grid-current-limiting resistors 185 and 186 respectively and through the resistor 227 to (B—) so that these tubes are normally biased to a voltage which prevents them from being conductive.

The shield grids of both of these tubes 187 and 188 are provided with a blanking control provided by the wires 162 and 189 respectively. This blanking control is similar to that provided for gas tube 157 included in the noise eliminator 131. For example, the shield grid of tube 187 is connected through a voltage dividing resistor 228 to the bus 162 and is also connected through resistor 229 to (B—). A positive voltage normally appears on bus 162 so that the voltage at the shield grid of tube 187 is of a sufficient value that it does not prevent the conduction of tube 187. In other words, it is only required under such circumstances that the control grid-cathode potential be suitably raised above the firing level for this tube to make this tube conduct. Normally, a positive voltage also appears on tube 187 so that this tube is also not normally blanked. Consequently, the positive voltage appearing at the plate of tube 183 is effective to make both tubes 187 and 188 momentarily conductive. Of course, if the voltage on wire 189 is at or near ground level, the shield grid will actually have a negative voltage applied to it so that tube 188 cannot become conductive even if its control grid is driven positive.

A quenching circuit similar to that already described for the various gas discharge tubes included in the detection and coincidence apparatus is associated with each of these gas discharge tubes 187 and 188 so that they remain conductive only momentarily following the input pulses applied to their control grids. As a result of the fact that these tubes are thus made only momentarily conductive, the corresponding decreases of potential at their plates appear as negative pulses which are applied to the various code rate discriminators. The negative pulse appearing at the plate of tube 187, is applied over wire 198 to the input of the first timer 230 included in the 180 rate discriminator and also to the first timer 240 included in the 120 rate discriminator. The negative pulse appearing at the plate of tube 188, on the other hand, is applied over wire 191 to the first timer 250 included in the 75 rate discriminator.

*Code rate discriminators*

With but few exceptions, the various code rate discriminators are similar and operate in much the same manner. The differences reside in the timing of the various electronic timer circuits and gating circuits, and also in the fact that the 120 rate discriminator does not include a blanker corresponding to the blanker 134 and 154 associated with the 180 and 75 rate discriminators. Because of this similarity in the various discriminators, a detailed description of these units will first be given with reference to the 180 rate code discriminator, and subsequent description will point out the differences between this and the other code rate discriminators.

The input to the first timer 230 included in the 180 rate discriminator consists of negative trigger pulses each of which is produced by the firing of gas discharge tube 187 included in the first driver 133. The first timer 230 includes an electronic timer comprising the diode 196 and triode tube 197. The plate of diode 196 is connected through resistor 200 to (B+) and the cathode is connected through resistor 237 to ground. Resistor 192 supplies the plate load for tube 197 and this plate is by-passed to ground for high frequency spurious voltage variations by condenser 193. This electronic timer operates in exactly the same manner as the timer included in the noise eliminator 131. Consequently, each negative pulse appearing on bus 198 and applied through coupling condenser 236 to the cathode of diode 196 causes the charging of condenser 199 so that the normally conducting triode tube 197 becomes non-conductive. Consequently, an abrupt increase of voltage occurs at the plate of tube 187. At the end of the timed interval, when condenser 199 is discharged to the level where tube 197 can again conduct plate current, the plate voltage of tube 197 quickly is lowered.

The first gate source 231 includes a triode tube 204 which has its plate connected through resistor 203 to (B+), and its grid is connected through the resistors 202 and 201 to this same (B+) source. This connection of the control grid to a source of positive voltage establishes an approximately zero potential difference between control grid and cathode of this tube. At the beginning of the interval timed by the first timer 230, the plate voltage of tube 197 is increased as has been described. This increase of voltage cannot substantially affect the plate current nor the plate voltage of tube 204. At the end of the timed interval, however, the plate voltage of tube 197 is decreased, and the resulting discharge of condenser 205 causes the grid-cathode voltage of tube 204 to be driven below cutoff. As a result, the plate voltage of this tube rises and a relatively large positive voltage appears on wire 238 and is applied to the relay control 235. As condenser 205 continues to discharge, the grid voltage of tube 204 rises towards its normal level which is substantially near ground potential so that after an interval, tube 204 again begins to conduct. During this predetermined interval of non-conduction of tube 204 its plate voltage is considerably raised above its normal relatively low value.

The advantages derived by supplying the input pulse to tube 204 to the junction of resistors 201 and 202 rather than to the control grid directly are best illustrated by referring to Figs. 10A and 10B. Fig. 10A illustrates approximately the variation in grid voltage of tube 204 that is produced if a 150 volt decrease of potential occurs at the plate of tube 197. Immediately upon the occurrence of this voltage drop, the grid potential drops by an amount equal to that of the voltage decrease appearing at the plate of tube 197, and as condenser 205 discharges, the grid voltage rises exponentially towards its normal value. Note particularly that by the time the grid voltage nears the cutoff voltage for the tube which is assumed to be 20 volts, the grid voltage is varying relatively slowly with respect to time. As a result, slight variations in the circuit conditions such as a change of a few volts in the amplitude of the voltage drop appearing at the plate of tube 197 will cause a substantial variation in the time during which the tube 204 is cut off. This time of cutoff extends from point "A" to point "B" in Fig. 10A. By way of contrast, Fig. 10B shows the same value of voltage decrease appearing in a circuit in which the connection is made to the junction of the resistors connected between the grid and the (B+) voltage source. In this organization a decrease of grid voltage occurs only after the voltage at the junction of the resistors 201 and 202 has been decreased to approximately ground voltage, and a further decrease of the assumed 20 volts required for cutoff must take place before the tube actually ceases conduction. Then as the voltage at the junction of resistors 201 and 202 rises because of the decay of the discharging current for condenser 205, the tube begins to conduct at a point "D." After a still further 20 volt increase, the grid again begins to draw current and the grid potential remains at approximately the same level while the voltage at the junction of the resistors 201 and 202 continues to rise towards the positive value that it normally assumes. In this instance, the grid voltage is varying more rapidly with respect to time as it reaches the cutoff level so that slight variations in the circuit conditions affect the time that tube 204 is cut off very slightly. The time of cutoff here extends from point "C" to point "D." Since the time of cutoff of tube 204 determines the length of the first gate voltage applied to the relay control 235, and also controls at the end of this interval the initiation of operation of the second timer 233 through the second driver 232, it is evident that an important advantage is gained by this accurate timing of the first gate 231.

The timing characteristics of both the first timer 230 and the first gate source 231 will later be described more fully. At this time, it is considered sufficient to say that the interval timed by the first timer 230 is approximately equal to the complete cycle time of the 180 code rate. More specifically, a portion of this cycle time is always measured by the preliminary timer 132 as it responds to the output from the noise eliminator 131 for reasons to be described later. As described, the first driver 133 is effective, at the end of the interval timed by the preliminary timer 132, to supply a pulse to the first timer 230 which initiates the timing operation of this latter circuit. The first timer 230 then measures approximately the remainder of the complete cycle time for the 180 code rate. Actually, the first timer completes its timing operation just prior to the expected occurrence of the next 180 rate pulse to occur at a full cycle time following the first input pulse, assuming, of course, that the coded rail current is of the 180 rate. In other words, the preliminary timer 132 and the first timer 230 time measure, in succession, substantially the fully cycle time of the 180 code rate. At the end of the interval timed by the first timer 230, the first gate source 231 supplies a positive voltage over the bus 238 to the relay control 235 as has been described. The duration of the positive voltage is such that it will overlap the expected occurrence of the next 180 rate pulse with suitable operating margins to either side.

The second driver 232 responds to the voltage decrease occurring at the plate of tube 204 at the end of the interval timed by the first gate source 231 and causes a negative output pulse to be applied over wire 246 to the second timer 233. The second driver 232 includes a triode tube 212 and a gas discharge tube 214. Tube 212 has its plate connected through resistor 213 to (B+), and its control grid is connected to the same point through the resistor 213. The input voltage to the control grid of tube 212 is obtained from the plate of tube 204 through the coupling condenser 211, which, together with resistor 213, forms an R-C differentiating combination. When tube 204 in the first gate 231 is first driven to cutoff, the increase of its plate voltage cannot appreciably effect the plate current nor the plate voltage of tube 212 because the tendency of the grid voltage to rise is counteracted by a corresponding increase of grid current. However, at the end of the cutoff interval of tube 204, the decrease of plate voltage that occurs causes the discharge of condenser 211 so that the grid-cathode voltage of tube 212 is momentarily driven below cutoff. The resulting increase of plate voltage of this tube is coupled through condenser 216 and grid-current-limiting resistor 215 to the shield grid of the gas discharge tube 214. The time constant of condenser 211 and resistor 213 is relatively small, however, so that condenser 211 quickly discharges and tube 212 quickly again begins to conduct with the result that the positive pulse at the plate of this tube is momentary.

Although the control grid of tube 214 is normally maintained sufficiently negative with respect to the cathode by its connection through resistor 195 to (B−) to keep this tube non-conductive, the increase of tube 212 plate voltage overcomes this negative bias voltage momentarily so that tube 214 can become conductive, provided that its shield grid-cathode potential is then at the proper level. The shield grid of tube 214 is shown as being connected directly over wire 246 to the plate of tube 220 included in the second timer 233. As will shortly be made clear, the shield grid potential that is normally provided by this connection is such that it does not prevent the conduction of tube 214 in response to the positive pulse appearing on its control grid from tube 212. A quenching circuit similar to that previously described in connection with the other gas discharge tubes and including condenser 217 is provided so that tube 214 will conduct only briefly. Consequently, a negative pulse of short duration appears at the plate of tube 214.

The second timer 233 shown in Fig. 8B includes another timing circuit comprising the diode 220 and triode tube 221. This timing circuit is identical with the first timer 230 except for the fact that condenser 239 is of a somewhat different value than the condenser 237 so that the interval timed by this second timer 233 in response to the negative pulse obtained from the second driver 232 is correspondingly different than that timed by the first timer 230. The differences between this variation in timing will be fully described later. The second gate source 234 is also identical with the first gate source 231 so that tube 233 included therein remains non-conductive for a predetermined length of time immediately following the termination of the timing by the second timer 233. During the time that tube 223 is cut off, it supplies a positive voltage through coupling condenser 224 and grid-current-limiting resistor 225 to the control grid of the gas discharge tube 208.

The timing characteristics of the second timer 233 and the second gate source 234 are, with but few exceptions, the same as that of the corresponding first timer 230 and first gate source 231. Briefly, the second timer 233 measures an interval of time beginning with the end of the positive gating voltage provided by the output of the first gate source 231 and concluding just prior to the expected time of occurrence of the next 180 rate pulse to occur at two full-cycle times following the first pulse. At the end of this timed interval, the second gate source 234 provides a positive voltage to the control grid of the gas discharge tube 208, and the duration of this positive voltage is such that it overlaps the expected time of occurrence of the third 180 rate pulse, i. e. the pulse occurring at two full cycle times after the first input pulse.

The relay control 235 comprises a gas discharge tube 208 which has its shield grid connected to the plate of tube 223 in a manner already described, and its control grid is connected through grid-current-limiting resistor 207 and coupling condenser 206 to the plate of tube 204 included in the first gate 231. Both shield and control grids of tube 208 are also connected through grid-current-limiting resistors 226 and 210 respectively to (B−) so that both of these grids are normally biased to a value that prevents the tube 208 from conducting.

The plate of tube 208 is connected through the winding of relay 180R to bus 174 which, as has been described, receives a voltage from the output of the cathode follower tube 172 included in the preliminary timer 132. As explained in connection with the description of the preliminary timer 132, wire 174 is normally at ground potential, but a positive voltage appears on wire 174 during the interval timed by the preliminary timer 132 in response to each output of the noise eliminator 131. Thus, positive voltages must be simultaneously applied to both shield and control grids at the same time that a positive voltage appears on bus 174 in order for tube 208 to conduct and energize the windings of relay 180R. The tube is extinguished and the relay 180R again deenergizes when the voltage on wire 174 is restored to its normal ground level. In other words, the first gate source 231 and the second gate source 234 must simultaneously apply positive output voltages to the control grid and shield grid of tube 208 respectively at the same time that the preliminary timer is timing an interval and providing a positive voltage on the wire 174.

Although tube 208 does not become conductive until control grid, shield grid, and plate are all supplied with the proper positive potentials, the removal of these positive potentials from either shield or control grid or both does not make tube 208 non-conductive because the grids cannot control the conduction of this gas discharge tube after it has once become conductive. Thus, tube 208 continues to conduct until the positive voltage is removed from wire 174 as this deenergizes the plate-cathode circuit so that conduction must cease.

A description of the triple time coincidence of the decoding apparatus 31 of this invention has already been described in a general manner in connection with Fig. 7. The present description will give a somewhat more detailed picture of the triple time coincidence features with reference particularly to the detailed circuit drawings of Figs. 8A–8D and particularly also with reference to the 180 rate discriminator since its manner of operation is, for the most part, typical of that of the other similar units. Certain detailed features and differences between the various code rate discriminators will be introduced in connection with the description of the time diagrams of Figs. 9A–9C.

When coded rail currents are first applied to the rails of a track section following a period of no track current, or when a train first enters a track section in which coded rail currents are present, the first leading or trailing edge of an "on" period of the rail current, depending upon which occurs first, produces an output pulse from the code detection and coincidence apparatus 30. This pulse is applied to the noise eliminator 131 and, in turn, produces an output which is applied to the preliminary timer 132. The noise eliminator is at the time capable of supplying an output because the first timer 230 of the 180 rate discriminator is then not operating or timing an interval so that tube 157 in the noise eliminator is not blanked. The preliminary timer then times a short interval and, at the end of this interval, causes the first driver 133 to supply an output pulse to the first timer 230 of the 180 rate discriminator. Output pulses from the first driver 133 are also applied to the first timers 240 and 250 of the 120 and 75 rate code discriminators respectively, but this condition will be ignored at the present time because it has no effect upon the operation of the 180 rate code discriminator.

During the time that the preliminary timer 132 is operative, a positive voltage also appears on wire 174 and so energizes, through the windings of relay 180R, the plate of gas discharge tube 208 included in the relay control 235. Energizing the plate of tube 208 has no effect upon the conduction of this tube at this time because both its shield and control grid potentials are then maintained substantially below that of the grounded cathode.

As described, the first timer is set into operation at the end of the interval timed by the preliminary timer 132 and continues its timing operation until just before the next input pulse occurring at a full cycle time of the 180 rate following the first input pulse which is received by the noise eliminator 131. In the meantime, action of the blanker 134 upon the noise eliminator 131 has suppressed the intermediate pulse. At the end of this interval timed by the first timer, the first gate source 231 becomes operative and applies a positive voltage over wire 238 to the shield grid of gas tube 208 included in the relay control 235. During the time that this gating voltage is applied to the shield grid of tube 208, the next-received input pulse of the 180 rate produces an output from the noise eliminator 131 which again sets the preliminary timer into operation. Again the plate of tube 208 is energized by the high potential then appearing on wire 174. The second gate source 234 has, as yet, not been operated so that the control grid of tube 208 is maintained at a negative potential, preventing the conduction of this tube. Shortly after the occurrence of this second input pulse to the first timer, the first gate source 231 restores itself to normal, and, in so doing, causes the second driver 232 to supply an output pulse over wire 247 which sets the second timer 233 into operation. This second timer then times an interval which expires just prior to the expected time of occurrence of the third 180 rate pulse occurring at two full cycle times following the first. The intermediate pulse occurring between the second and third input pulses to the first timer 230 is again eliminated by the blanker 134. At that time, the second gate source 234 is operated and supplies a positive voltage to the control grid of tube 208.

In the meantime, the second received pulse has been effective to initiate operation of the first timer 230 so that, at the same time that the second gate source 234 supplies a positive voltage to the control grid of the tube 208, the first gate source 231 supplies a positive voltage over wire 238 to the shield grid of this tube 208. During this interval in which positive voltages are applied to both control and shield grids of tube 208, the third input pulse arrives and causes the noise eliminator 131 to again put into operation the preliminary timer 132. Again a positive voltage appears on wire 174 to energize the plate of tube 208. With both grids and the plate thus properly energized, tube 208 becomes conductive and remains in this condition until the end of the interval timed by the preliminary timer 132 when tube 172 becomes non-conductive and the voltage on wire 174 drops to ground level. Thus, upon the occurrence of the third input pulse to the preliminary timer 132, the second gate source, in response to the first input pulse, is supplying a positive voltage to the control grid of tube 208; and the first gate source, in response to the second input pulse, is applying a positive voltage to the shield grid. The third pulse causes the preliminary timer to energize the plate of tube 208 with the result that it then becomes conductive.

Both the preliminary timer 132 and the first timer 230 of the 180 rate discriminator are set into operation by each input pulse, assuming, of course, that the intermediate pulses are eliminated by the blanker 134. The duration of the interval timed by the first timer 230 is determined by the length of time required for condenser 199 to discharge to the level where tube 197 can again conduct. The voltage that exists at that time across condenser 199 is the cutoff voltage for tube 197 and thus does not represent the fully discharged condition of the condenser 199. As already stated, the operating times of the first timer 230 and the first gate source 231 are such that the first timer completes its timing operation just prior to the expected timer of occurrence of the next 180 rate pulse, and the first gate source 231 then supplies a positive gating voltage over wire 238 for a timer which just overlaps, with suitable operating margins to either side, the expected time of occurrence of that next pulse. If such next pulse arrives early, it may produce an output from the noise eliminator 131 immediately following the end of the interval timed by the first timer 230. Such next pulse cannot, therefore, effectively be used to set the first timer 230 again into operation because sufficient time has not elapsed for this first timer to be fully restored to its normal condition with condenser 199 discharged. This factor explains why the preliminary timer 132 is included in the decoding apparatus 31. Thus, the interval timed by the preliminary timer 132 continually inserts a short waiting interval following each output pulse from the noise eliminator 131 so that restoration of the first timer 230 to its normal condition is ensured. This condition applies equally well to the first timer 240 and 250 associated with the 120 and 75 code rate discriminators respectively.

The description of the timing characteristics of the various timing and gating circuits with respect to the 180 rate discriminator has been based upon the assumption that the input pulses to the first timer 230 occur only at intervals of a complete code cycle. It has constantly been assumed, of course, throughout the description of the 180 rate discriminator that the coded rail current is of the 180 rate. The description of the code detection and coincidence apparatus 30 has made it clear, however, that input pulses to the noise eliminator 131 ordinarily occur only at both the beginning and end of each "on" period of the rail current. For this reason, circuit means have been provided which eliminate from the input to the various discriminators those pulses which occur at half-cycle times. For convenience, these pulses may be termed "intermediate" pulses, and their elimination from the inputs to the various discriminators allows the various electronic timers to time full cycle times of the corresponding code rate, thereby eliminating the problem arising from code distortion as has been pointed out.

The blanking of intermediate pulses at the 180 rate is accomplished by the blanker 134. This blanker includes a single triode tube 130 which receives an input voltage over wire 240 from the plate output of tube 197 included in the first timer 230. When the first timer 230 is not in its timing condition, tube 197 is conductive so that its plate voltage is relatively low. The voltage that then appears at the control grid of tube 130 as a result of the voltage divider provided by resistors 144 and 145 connected between the plate of tube 197 and (B−) cause the tube 130 to be cut off. Consequently, there is substantially no voltage drop across resistor 209 so that a relatively high voltage appears on bus 162. Under this condition, the shield grid-cathode potential of tube 157 included in the noise eliminator 131 is sufficiently high so that tube 157 need only have its control grid-cathode potential raised in order for it to become conductive. On the other hand, when the first timer 230 is timing an interval, tube 197 is cut off so that its plate voltage is high. The control grid-cathode potential of tube 130 is then substantially above cut-off so that the voltage appearing on bus 162 is greatly reduced. The voltage that then appears on the shield grid of tube 157 is sufficiently low with respect to the grounded cathode to prevent this tube from conducting even if its control grid is driven positive.

The first pulse to appear in the input to the noise eliminator 131 finds the gas tube 157 unblanked because the first timer 230 is then not in its timing condition so that the blanker then supplies a positive voltage to bus 162, thereby "opening" the gas tube 157. This first input pulse causes the operation of the preliminary timer and then the first timer 230. The preliminary timer 132 times only a relatively short interval, and the rest of the interval making up substantially the full cycle time of the 180 code rate is taken up by the first timer 230. Therefore, at a half-cycle time later, when the next input pulse is received by the noise eliminator 131 (180 code rate assumed), the first timer 230 is at that time in its timing condition with tube 197 cut off. The voltage on bus 162 is then at a low level because of the action of the blanker 134 so that the shield grid potential of tube 157 is effective to blank this tube. This intermediate pulse cannot, therefore, produce an output from the noise eliminator 131. The next input pulse to the noise eliminator 131 should occur, however, during the time that the positive gating voltage is applied by the first gate source 231 to wire 238 and occurs, therefore, at the end of the interval timed by the first timer 230. At that time, the blanker 134 supplies a positive voltage to bus 12 with the result that the shield grid potential of tube 157 does not blank this tube. This pulse can, therefore, produce an output from the noise eliminator 131 which will initiate operation of the preliminary timer 132.

As previously described, the input pulses to the first timer 230 are obtained from the plate of tube 187 in the first driver 133. Fig. 8B shows that the blanking voltage appearing on bus 162 is applied not only to the noise eliminator 131 for the reasons already set forth, but is also applied as a blanking voltage to this gas discharge tube 187. The application of this blanking voltage to the shield grid of tube 187 ensures that the conduction of this tube will be only momentary so that each negative pulse applied to the input of the first timer 230 will be of uniform duration. This factor is important in that it allows condenser 199 to be charged to the same negative potential each time with the result that the timing of this first timer 230 will be more nearly uniform. As was explained in detail in connection with the description of the quenching circuits provided for the various gas discharge tubes, each gas discharge tube is initially made non-conductive following its firing by reason of the low plate voltage that exists after the plate-to-ground capacitor has discharged. By the time the plate potential has again risen to the firing level, the tube is deionized so that the grid can regain control. If the control grid at that time is still sufficiently positive with respect to the cathode, the tube will again fire. To prevent this, the blanking voltage is applied to the shield grid. Since the tube cannot again become conductive if either control or shield grids are held substantially negative with respect to the cathode voltage, the tube remains non-conductive. Thus, each output pulse of tube 187, in initiating operation of the first timer 230, causes a blanking voltage to be applied to its shield grid through action of the blanker 134 so that the tube conducts only momentarily when its control grid is positively pulsed even if the positive voltage remains for a longer time on the control grid. Similar negative control voltages are provided for the gas discharge tubes included in the second driver of each code rate discriminator. In the second driver 232, for example, the shield grid of tube 214 is controlled over wire 246 by the plate voltage of tube 220 included in the second timer 233.

Certain characteristics of the various code rate discriminators and also the details of the manner in which they differ can more clearly be explained in connection with the time diagrams of Figs. 9A–9C. Fig. 9C, for example, shows the operation of the various code rate discriminators in response to coded rail current of the 180 rate. In this drawing as well as in Figs. 9A and 9B, times are indicated in milliseconds with reference to a time scale appearing on the drawing where the zero time reference is coincident with the first input pulse to the decoding apparatus 31. The duration, in milliseconds of various gating voltages is also shown. Although the length of timed intervals and the duration of gating voltages are specifically shown, these references are only for the purpose of providing a detailed example of one form of the decoding apparatus and are in no way intended to limit the scope of the invention.

When the 180 code rate is applied to the track rails, three "on" periods of the rail current occur each second so that the time of a full cycle is approximately 333 milliseconds. The first input pulse to the decoding apparatus 31 causes an output of the noise eliminator 131 which then sets the preliminary timer 132 into operation. The preliminary timer is shown at line B of Fig. 9C as timing an interval of 60 milliseconds, and at the end of this 60 millisecond interval, the first timer 230 receives an input which causes it to time a period of 253 milliseconds. As a result, the total time measured by the preliminary timer and first timer 230 in succession equals 313 milliseconds. During this time measured by the first timer 230, the output of the blanker 134 is shown in line L as being at a low level so that the noise eliminator 131 is prevented from supplying an output in response to the next or intermediate input pulse which may occur at about 167 milliseconds. At the 313 millisecond time, the first gate source 231 is put into operation and supplies a positive voltage over wire 238 for a 40 millisecond interval as indicated at line D. At the end of this time, the second timer 233 receives an input from the second driver 232 and starts to time an interval having a duration of 293 milliseconds. In the meantime, the input pulse occurring on or about 333 milliseconds initiates operation of the preliminary timer 132 and then the first timer 230. Both first timer 230 and second timer 233 terminate their timing operations at approximately 646 milliseconds and then cause both the first gate source 231 and second gate source 234 to provide positive voltages to the control and shield grids of gas tube 208 for 40 millisecond intervals. The intermediate pulse which occurs after the pulse at 333 milliseconds is again terminated by action of the blanker as it responds to the first timer 230 and shown in line L. The input pulse that is expected to occur at 666 milliseconds also initiates operation of the preliminary timer 132 which then causes energization of the plate of gas tube 208. At this time, therefore, the preliminary timer, the first gate, and the second gate are all operative and apply positive voltages to the various electrodes of tube 208 at the same time. As a result, the relay control 235 is operated as indicated at line M so that the relay 180R is momentarily energized. The operation is the same for subsequent inputs to the decoding apparatus so that the relay control 235 is operated intermittently successfully and so controls the cab signals to display a green aspect in a manner that has already been described in detail.

The following description will point out the manner in which the 120 and 75 rate discriminators respond to the 180 code rate and will illustrate the reasons why intermittent energization of the respective relays 120R and 75R is not obtained. The first timer 240 of the 120 rate code discriminator also receives an input from tube 187 included in the first driver 133. The characteristics of this first timer are such that it ordinarily would conclude its timing operation a short interval before the next input pulse occurring at a full-cycle time of the 120 rate following the first pulse. Since two "on" periods of the track current occur each second for the 120 code rate, the full cycle time of this code rate is 500 milliseconds. The first timer 240 thus concludes its timing operation normally at about 470 milliseconds. This time is indicated in line G by the dotted line at the 470 millisecond time. Prior to this time, however, the second input pulse of the 180 code rate has occurred at 333 milliseconds. This pulse causes an input to again be applied to the first timer 240 so that it again begins timing. This action continues repeatedly while the 180 code rate is being received so that the first timer 240 never receives an opportunity to time out and thus initiate into operation the first gate source 241 of this 120 rate code discriminator. As a result, no gating voltages are applied to the grids of the gas discharge tube included in the relay control 245.

The first timer 250 included in the 75 rate discriminator is also operated as a result of the first input pulse to the decoding apparatus. This first timer 250, however, receives its input from the plate of tube 188 included in the first driver 133. A full cycle time of the 75 code rate is 800 milliseconds long so that the first timer 250 is organized to complete its timing at approximately 750 milliseconds. The first gate 251 then supplies a positive voltage for 100 milliseconds to the control grid of the gas discharge tube included in the relay control 255. At the end of this 100 millisecond voltage, the second driver 252 causes the second timer 253 to begin timing and this timing operation continues until 1550 milliseconds. During the time that the first timer 250 is in its timing condition, the blanker 135 is controlled to supply a blanking voltage over wire 189 to the shield grid of tube 188. As a result, the first timer 250 does not receive any input in response to the second and third input pulses of the 180 rate occurring at 333 and 666 milliseconds. The next input pulse to be applied to the first timer 250 is that occurring in response to the input pulse at 1000 milliseconds, at which time the first timer 250 is again set into operation. Fig. 9C clearly indicates that no coincidence occurs between the gating voltages provided by the first and second gates 251 and 254 and the output voltage of the preliminary timer 132. Therefore, the relay control 255 is not effective in response to the 180 code rate to energize the relay 75R.

Fig. 9B illustrates the timing characteristics of the various code rate discriminators in response to a track code of the 120 rate. This drawing clearly indicates that the required coincidence of voltages for the relay control 235 included in the 180 rate discriminator cannot be obtained in response to this 120 code rate. Although the operation of the first timer 230, first gate source 231, second timer 232 and second gate source 233 are as has been described, the lines B, C, D and E show that the input pulses occur at a rate which makes impossible the coincidence of positive voltages provided by the preliminary timer, and first and second gate sources.

With respect to the 120 rate discriminator, however, the desired coincidence is readily obtained as indicated in lines G, H, I and J. The relay control 245 is intermittently operated because of the coincidence obtained by the gating voltages provided by a preliminary timer and the first and second gate sources 241 and 244 of the 120 rate discriminator. It should be noted here that the intermediate pulses of the 120 code rate are eliminated from the input to the first timer even though no separate blanker is provided for the 120 rate discriminator. The reason for this is that the blanker 134 associated with the 180 rate discriminator is equally effective at eliminating intermediate pulses of the 120 rate as it is for eliminating this pulse at a 180 rate. The output of the blanker 134 is diagrammatically illustrated at line O of Fig. 9B, and the blanking voltage that it provides upon the noise eliminator 134 continues until the first timer 230 of the 180 rate discriminator is restored to normal which is at 313 milliseconds. Thus, this time extends well beyond the expected occurrence of the intermediate pulse of the 120 rate which occurs at about 250 milliseconds as shown at line A.

The first timer 250 of the 75 rate discriminator again receives input pulses from tube 188 included in the first driver 133. A coincidence between the gating voltages and the output of the preliminary timer 132 is not obtained, however, as indicated at lines K, L, M and N.

The time diagram pertaining to the decoding apparatus as it responds to a 75 code rate is diagrammatically illustrated in Fig. 9A. A coincidence of gating voltages for gas tube 208 included in the relay control 235 included in the 180 rate discriminator is not obtained as shown in lines C, D, E, F and G. Thus, the relay 180R is not intermittently energized.

As was shown to occur with the 180 code rate, the first timer 240 of the 120 rate discriminator is continually held in a timing condition when a 75 code rate is being received as shown at line H. The blanking interval of the blanker 134 is not of sufficient duration to eliminate intermediate pulses of the 75 code rate. Thus, in response to the first input pulse to the decoding apparatus, the blanker 134 is effective upon the noise eliminator only until approximately 313 milliseconds when the first timer 230 completes its timing operation. The intermediate pulse of the 75 code rate occurs at about 400 milliseconds, however, so that it is not eliminated. This characteristic explains the need for the separate blanker 135 for the 75 rate discriminator and the separate gas tube in the first driver 133 which supplies the input to the 75 rate discriminator. This blanker 135 operates in response to the first timer 250 in just the same manner as does the blanker 134 in response to the first timer 230. Thus, a low shield grid voltage for tube 188 prevents its conduction whenever the first timer 250 is in its timing operation.

If input pulses to the decoding apparatus occur at both the leading and trailing edges of each "on" period of the track code, the noise eliminator 131 will supply an output pulse to the preliminary timer 132 upon both leading and trailing edges. Since these input pulses occur at shorter intervals than the normal timing interval of the first timer 240 of the 120 rate discriminator, this timer is constantly maintained in a timing condition. Consequently, the various gate sources and additional timers of the 120 rate discriminator cannot be operated since their initiation is dependent upon the restoration of the first timer to its normal condition.

The 75 rate discriminator is operated in much the same manner as are the other two code discriminators. Intermediate pulses are eliminated by the separate blanker 135 which is provided for this discriminator. Thus, the first gate source 251 and the second gate source 254 supply output voltages to the relay control 255 at the same time that a positive voltage is supplied by the preliminary timer as shown at lines C, I, J, K and L. The relay control 255 is operated each time this coincidence is obtained so that intermittent operation of the relay 75R is obtained.

These drawings show that the duration of the positive voltages provided by the gate sources for the various discriminators are in proportion to the cycle times of the corresponding code rates. For example, the positive voltage provided by the first gate 231 included in the 180 rate discriminator is of 40 milliseconds duration as is also the duration of the positive voltage provided by the second gate 244. This length of time for the gating voltage allows for variations to either side of 20 milliseconds in the time of occurrence of the next input pulse. This, therefore, represents an operating margin of plus or minus three percent of the total time of two full cycles of the 180 code rate (approximately 667 milliseconds) since the double coincidence feature requires actually the measurement of the intervals between three successive input pulses, thereby encompassing two full cycle times. For the 120 code rate, the duration of the gating voltage is increased to 60 milliseconds which is again plus or minus three percent of the time of two full cycles or 1000 milliseconds. The same percentage margins are provided for the 75 rate discriminator. Of course, although margins of three percent are mentioned here, other suitable operating margins could as well be chosen.

It has already been mentioned that direct-current codes may become distorted because of the character of the track circuit. This characteristic has been illustrated in Fig. 13 where the "on" period of a code is indicated as having abrupt leading and trailing edges as it is applied to the sending end of the track circuit; but because of the inductance, capacitance and leakage resistance of the track circuit, the leading and trailing edges are considerably distorted at the entering end of the track circuit. As the sending end of the track circuit is approached, this distortion becomes less.

This condition of possible distortion of the "on" period is discussed so as to emphasize the characteristic of the present invention in responding to the rate of change of current in the track rails rather than the amplitude of the track current. It can be seen that the distorted "on" period is prolonged and that the track current would probably cause a track relay to be energized for a longer time than the "on" period at the sending end. However, the code detecting apparatus of the present invention involves the shock excitation of a tuned receiving circuit which is responsive to the rate of change of the track current. Since the greatest rate of change in the distorted code occurs at points corresponding to the proper leading and trailing edges of the "on" period, this distortion will not appreciably affect the operation of the apparatus. It may be necessary that the transmitting apparatus be adjusted to shorten the "on" period to provide proper operation of the track relay for the wayside apparatus, but if this time of the "on" period is shortened then such shortened period will be detected by the vehicle-carried receiving circuits and will provide outputs in accordance therewith. As previously mentioned, this distortion of the code is not harmful for two reasons.

In the first place, the decoding apparatus of the present invention responds to the cycle period of the code rather than to just the "on" period, and since the cycle period does not vary even though the "on" period may be distorted, the operation of the decoding apparatus continues to give a proper response in accordance with the applied code.

The second reason is that the code rate discriminators respond only if a triple time coincidence occurs. Let us assume that a 75 code rate is distorted by the adjustment of the code transmitting apparatus to an extent indicated in Fig. 11A. The inputs to the decoder 31 for an "on" period of distorted code occur at the time spacing of a 180 code cycle but the time separating each pair of such pulses is considerably different so that although two pulses will provide a double time coincidence the third input pulse does not occur at the right time to provide a triple time coincidence in the 180 rate discriminator.

Similarly, with reference to Fig. 11B, it is noted that the distortion of the "on" period of a 75 code may be of such a value as to provide input pulses to the decoder at a time spacing corresponding to a 120 code cycle. Again these two input pulses to the decoder may cause a double coincidence in the 120 rate discriminator, but the third pulse is at a different time so that triple coincidence cannot take place.

In brief, the distortion of the "on" periods of the coded rail currents, whether direct or alternating current, cannot cause the system to give a wrong cab signal, because in the first place the decoding is on the basis of code cycles rather than on the basis of "on" and "off" periods, and furthermore, if the distortion of an "on" period is such as to simulate the code cycle of a different rate than is being transmitted, the discriminator for that different rate cannot respond because triple time coincidence is required and the conditions for such time coincidence are not met.

SUMMARY

The system of the present invention constitutes a vehicle-carried equipment which is adapted to cooperate with coded wayside signalling circuits of either direct current, alternating current or rectified alternating current which coded currents may be distorted due to track circuit conditions and still be properly effective with respect to the vehicle-carried code detecting and decoding apparatus. The organization is so constructed as to be responsive to these different kinds of trackway coded currents even in the presence of foreign currents either direct or alternating. This, in general, is accomplished by providing code detection and coincidence apparatus which is distinctively responsive to the leading and trailing edges of the "on" periods of the coded track current.

The present invention also provides apparatus which is responsive, when there is coincidence between the codes in the two rails, but which is unresponsive to random disturbances on either rail alone. This coincidence apparatus is characterized by the fact that the transient voltages occurring at the beginning and end of each "on" period are reduced to pulses of short duration which can be used to establish conditions of the coincidence apparatus.

The invention is also characterized by the use of a so-called noise eliminator which makes it possible to employ a triple time coincidence code rate discriminator for each of the different code rates because this noise eliminator permits an output pulse to the discriminators only at proper times. In the first place, the noise eliminator prevents a rapid succession of pulses which are not distinctive of the leading and trailing edges of an "on" period from being effective. In the second place the noise eliminator can be blanked out or so controlled as to suppress outputs of pulses intermediate of the pulses marking the cycle times of the code being received.

The triple time coincidence code rate discriminators are constructed on the principle that the time coincidence of three pulses defining the times involved in two complete code cycles must be received in order to provide an effective output for controlling the cab signals.

Although the present invention has been disclosed by an embodiment of rather a specific nature, and the description has been specific even to the point of providing time charts giving times of operation as typical examples, it is to be understood that the same principles of operation may well be applied to other embodiments without departing from the principles of the present invention. For example, a triple time coincidence decoder could be operated on the pulses produced both at the beginning and end of each "on" period just as well as on the code cycle time pulses. Such a system would, of course, be associated with track circuits which have little or no distortion, or the time of operation of the gates might be prolonged sufficiently to provide margins for any distortions which might be present.

If such a modified code rate discriminator were to be employed it is obvious that the noise eliminator would likewise require certain modifications so as to provide outputs both at the beginning of an "on" period and at the end of an "on" period even though it was held in continuous operation during the "on" period by successive inputs caused by the relatively high values of the alternating current cycle. These variations are merely mentioned to indicate that the scope of the invention should not be considered limited to the specific timing characteristics herein disclosed.

Also, the rail coincidence feature might be modified to employ different kinds of gating so as to provide an output only providing an input is supplied to both channels at the same time. The particular coincidence tubes shown provide circuits for the dissipation of a single output pulse, but obviously positive acting gating circuits could be substituted.

Having thus shown and described a cab signalling system of the continuous inductive type as one specific embodiment of the present invention, it is desired to be understood that this form is selected to facilitate in the disclosure of the invention rather than to limit the number of forms which it may assume; and it is to be further understood that various modifications, adaptations, and alterations may be applied to the specific form shown to meet the requirements of practice, without in any manner departing from the spirit or scope of the present invention.

What we claim is:

1. In a continuous inductive cab signal system, track circuits including track rails, some of said track circuits being supplied with coded unidirectional rail currents and others being supplied with coded alternating rail currents of a selected frequency, said rail currents being applied throughout the "on" periods of any one of a plurality of different code rates dependent upon traffic conditions, vehicle-carried equipment including a receiver winding in inductive relation to each track rail and tuned to a frequency different from said selected alternating coded rail current frequency, said receiver windings having transient voltages induced therein upon the application and removal of rail current, an amplifier for each receiver including a vacuum tube having its grid-cathode circuit connected across the winding of the corresponding receiver and responsive to transient voltages induced in that winding, and means including an electron discharge tube controlled by the combined outputs of said amplifiers and rendered effective only if voltages induced in both said receiver windings are coincidental, whereby an effective output is obtained for transients produced by changes in coded rail current occurring simultaneously in both track rails but not by stray interference affecting the receiver windings separately at different times.

2. In a cab signalling system for railroads, track circuits including track rails, said track circuits having coded currents of different selected rates applied thereto in accordance with traffic conditions to provide sustained "on" and "off" periods of current occurring simultaneously in both said track rails, vehicle-carried equipment comprising a receiver mounted adjacent each of the two track rails to be inductively responsive to coded current changes in the rails, circuit means connected to each receiver for tuning it to a selected resonant frequency different from the frequencies comprising said "on" periods of the coded currents in the track rails, a first circuit means connected to one of said receivers and including amplifying and pulse forming means to produce a short output pulse for each transient voltage induced in its receiver by each beginning and end of an "on" period of rail current, a second circuit means connecting to the other of said receivers and including amplifying and pulse forming means to produce a short output pulse for each transient voltage induced in its said receiver by each beginning and end of an "on" period of rail current, coincidence circuit apparatus connected to said first and second circuit means and effective to give an output only provided an output pulse is simultaneously received from both said first and second circuit means, and decoding apparatus controlled by said coincidence circuit apparatus and responsive to outputs therefrom associated with the transient voltages existing in said receivers at recurrent time intervals characteristic of the different rates of the coded rail currents in the track circuits to give distinctive indications in accordance with the rate of the then existing coded rail currents.

3. A continuous inductive cab signal system of the character described comprising, a pair of track rails, vehicle-carried equipment including a receiver over each of said track rails ahead of the vehicle, each receiver having coils on the vertical legs of an inverted U-shaped iron core disposed over the corresponding track rail, a capacitor tuning the coils of each receiver to resonance at a frequency different from the alternating coded rail current, said coils of each receiver being wound and connected such that transient voltages induced therein by the application and removal of current in the associated track rail are cumulative while voltage induced in said coils by flux changes of external magentic fields are in opposition, vacuum tube amplifiers for amplifying the cumulative transient voltages in the coils of the respective receivers, and code responsive apparatus including an electron discharge tube controlled by the combined outputs of said amplifiers, said electron discharge tube being rendered conductive only if coincidental transients are produced in the coils of said receivers by simultaneous current changes in both track rails, whereby immunity against improper response is obtained by requiring coincidental changes in the magnetic flux passing in opposite directions through the respective receiver coils.

4. In a cab signal system of the character described, track sections including track rails having code pulses comprising "on" periods of a selected alternating-current frequency applied thereto at various distinctive code rates in accordance with traffic conditions, vehicle-carried equipment comprising, tuned receiver windings in inductive relation to said track rails ahead of the vehicle, amplifying means connected with said receiver windings and including a grid controlled tube, a degenerative feedback unit including an inductance and a capacitor in multiple in the cathode circuit of said tube for automatically decreasing the grid-cathode voltage of said tube for voltages induced in said receiver windings by a steady state alternating current in said track rails of said track current frequency to which said degenerative feedback unit is tuned.

5. In a continuous inductive cab signal system for coded track circuits a pair of track rails, vehicle-carried equipment comprising, receiver windings disposed in inductive relation to said track rails ahead of the vehicle and tuned to a different frequency than the alternating-current frequency of the coded rail current in the track circuits traversed by the vehicle, amplifying means connected with said receiver windings and including a grid controlled tube, circuit elements in the grid circuit of said tube tuned to said alternating-current frequency for automatically decreasing its grid-cathode voltage for said frequency of grid excitation and thereby providing a degenerative effect for voltages induced in the receiver windings by steady alternating current in the track rails of that frequency, and decoding means responsive to recurrent energization at different code rate intervals controlled by said amplifying means.

6. A continuous inductive cab signal system of the character described operable on either alternating or direct current coded rail current comprising, track sections comprising track rails having said coded current applied thereto, vehicle-carried equipment having receiver windings mounted ahead of the vehicle adjacent the track rails to be inductively affected by changes in coded current, said receiver windings being included in a receiving circuit tuned to a resonant frequency different from the frequency conmprising the "on" periods of any coded alternating current likely to be encountered in said track rails, said receiving circuit thereby having transient voltages induced therein upon the application and removal of coded rail current regardless of whether it is alternating or direct current, circuit means including a vacuum tube for amplifying all such transient voltages of said receiving circuit, said circuit means producing control outputs in response to said transient voltages, and decoding apparatus controlled by the outputs of said circuit means associated with the transient voltages existing in said receiving circuit at recurrent time intervals characteristic of the different code rates of the coded rail current in the track circuits under different traffic conditions to give distinctive indications in accordance with the then existing code on the track rails.

7. In a cab signalling system for railroads, track circuits including track rails along the trackways having sustained "on" period of rail current of a selected frequency and at different selected code rates applied thereto in accordance with traffic conditions, a train-carried equipment comprising receiving coils mounted adjacent said track rails, circuit means connected to said receiving coils for tuning them to a selected resonant frequency different from said selected frequency, amplifying circuit means including a grid controlled vacuum tube connected to said receiving coils and responsive to the transient voltages induced in said receivers by each application and removal of said coded current to produce an output for all such transient voltages, circuit elements connected in the cathode-grid circuit of said vacuum tube causing it to act degeneratively with respect to steady alternating current, and decoding apparatus connected to said amplifying circuit means and responsive to its output to give distinctive indications in accordance with the rate of the code pulses causing such output; whereby the presence of foreign steady alternating current is rendered ineffective to a sufficient degree to prevent said amplifying circuit means from giving an undesired output.

8. In a continuous inductive cab signal system, track circuits including track rails being supplied with coded rail current of a selected frequency throughout the "on" periods of any one of a plurality of different code rates dependent upon traffic conditions, vehicle-carried equipment including a receiver mounted in inductive relation to each track rail and having windings tuned to a frequency different from said selected frequency of the coded rail current, said receiver windings having transient voltages induced therein upon the application and removal of coded rail current, and amplifier and pulse forming means for each receiver including a vacuum tube connected as an amplifier and having its grid-cathode circuit connected across the windings of the corresponding receiver, and also including a gas discharge tube connected to receive the output of its respective amplifying vacuum tube, said gas tube being biased to fire only upon the reception of a positive output from said vacuum tube above a predetermined amplitude to thereby provide an output pulse of short duration and substantially the same value for each transient voltage appearing in the corresponding receiver, and coincidence apparatus effective to give an output control only provided an output pulse is simultaneously received from both of said amplifier and pulse forming means.

9. In a cab signalling system for railroads having track currents of a selected frequency coded at different rates in accordance with traffic conditions, track circuits including track rails along the trackway, vehicle-carried apparatus including a receiver mounted in inductive relation to each track rail to be inductively responsive to current changes in the rail, circuit means connected to each receiver for tuning it to a frequency different than said selected frequency of said coded rail currents so that the application and removal of coded current at the different rates causes transient voltages to be produced in each receiver at the beginning and end of each "on" period of rail current, a first circuit means connected to one of said receivers and including amplifying means to produce an output pulse for each transient voltage in its receiver, a second circuit means connected to the other of said receivers and including amplifying means to produce an output pulse for each transient voltage in its said receiver, coincidence circuit apparatus including two normally conducting trigger tubes having common plate output connections and having their respective grid circuits connected to said first and second circuit means respectively, and decoding means connected to said common plate output connection of said trigger tubes and acted upon each time it receives an effective output from said trigger tubes to be distinctively controlled in accordance with the rate of recurrence of the transient voltages in said receivers at recurrent time intervals characteristic of the then existing code only provided such transient voltages occur simultaneously in both receivers.

10. In a coded cab signal system of the character described, track circuits including track rails having coded currents applied thereto, vehicle-carried equipment comprising, tuned receiver windings in inductive relation to the track rails ahead of the vehicle, decoding apparatus distinctively responsive to the time separation of controlling pulses characteristic of the different code rates for different traffic conditions, means including a vacuum tube amplifier and a communication channel for providing controlling pulses for operation of said decoding apparatus in response to voltages induced in said receiver windings, and blanking means including a timing device initiated by the reception of a controlling impulse over said communication channel for interrupting said communication channel for a predetermined time interval, whereby the excitation of said receivers and communication of a controlling impulse to said decoding apparatus is followed by a blanking period during which undesired impulses that may be created are not communicated to said decoding apparatus.

11. In a continuous inductive cab signal system of the character described operable on either alternating current of a selected frequency or direct current coded rail currents comprising, track sections including track rails having said coded currents applied thereto, vehicle-carried equipment having receiver windings mounted on the vehicle in inductive relation to the said track rails ahead of the vehicle and tuned to a frequency different from said selected frequency, said receiver windings having transient voltages induced therein upon the application and removal of the coded rail current, means including vacuum tubes for amplifying the voltages induced in said receiver windings, a noise eliminator including first timing means set into operation to measure a predetermined time by impulses from said amplifier and maintained operated when said amplifier supplies impulses closer together than said predetermined time measured by said timing means, said noise eliminator being effective to give a control output for each of its operations, decoding apparatus including relays maintained in an active condition when control outputs are intermittently received from said noise eliminator characteristic of the different rates of coded rail current for different traffic conditions, and second timing means acting each time said noise eliminator provides a control output to render said noise eliminator ineffective to give another control output until after a time has elapsed longer than said predetermined time.

12. In a cab signal system of the character described, track sections including track rails having rail current coded at different code rates applied thereto, vehicle-carried equipment comprising, receiver windings in inductive relation to said track rails ahead of the vehicle, decoding apparatus including relays maintained energized by the continuing reception of controlling impulses at time intervals characteristic of the different code rates under different traffic conditions, vacuum tube amplifying means and a communication channel for providing controlling impulses for said decoding apparatus in response to voltages induced in said receiver windings, time gating means for each code rate to be decoded including timing devices, blanking means controlled by said timing devices for interrupting the continuity of said channel for a predetermined blanking time interval in accordance with the time separation of controlling impulses belonging to a code rate of the coded rail current, and gating circuit means being made effective at the end of said blanking time interval for a limited gating time only to render said channel effective.

13. In a continuous inductive cab signal system, different track circuits each comprising a pair of track rails being energized with alternating current of a selected frequency and direct rail currents respectively at any one of a plurality of code rates dependent upon traffic conditions, vehicle-carried equipment operable without change in its circuit connections over both stretches of track comprising, receiver windings in inductive relation to said track rails ahead of said selected vehicle and tuned to a frequency different from the frequency of the coded alternating rail current, said receiver windings having transient voltages induced therein upon the application and removal of either alternating or direct rail currents, amplifying means for amplifying the voltages induced in said receiver windings by changes in rail current, said amplifying means including tuned circuit elements discriminating between the transient voltages and the steady state voltages induced in said receiver windings by extraneous alternating rail current, and decoding apparatus controlled by said amplifying means and responsive to outputs of short duration associated with the transient voltage existing in said receiver coils received at recurrent time intervals characteristic of the respective code rates of the coded rail current in the track circuits of said stretches under different traffic conditions.

14. A continuous inductive cab signal system of the character described comprising, track sections including track rails being energized with alternating current of a selected frequency or direct coded rail currents, vehicle-carried equipment having receiver windings in inductive relation to said track rails ahead of the vehicle and tuned to a frequency different from said selected frequency, said receiver windings having transient voltages induced therein upon the application and removal of the coded rail current, means including vacuum tubes for amplifying the voltages induced in said receiver windings, a noise eliminator including timing means controlled by the output of said amplifying means for providing control pulse outputs only if there has been no output from said amplifying means for a predetermined time somewhat longer than the time separation between the outputs of said amplifying means due to alternating coded rail current, and decoding apparatus including relays maintained energized only if control pulses are continuously delivered from said noise eliminator to said decoding apparatus at recurrent time intervals characteristic of the different code rates of coded rail current applied to the track circuits under different traffic conditions.

15. In a continuous inductive cab signal system, track circuits including track rails being energized with alternating current of a selected frequency at different code rates selected in accordance with traffic conditions, vehicle-carried equipment comprising receiver windings mounted on the vehicle ahead of the forward wheels within inductive relation to said track rails and tuned to a frequency different from said selected frequency, said receiver windings having transient voltages induced therein upon the application and removal of alternating rail current pulses, amplifying means including grid controlled vacuum tubes connected to said tuned receivers, said amplifying means including circuit elements tuned to said selected frequency of the coded rail alternating currents and connected in the cathode-grid circuit of said vacuum tubes to cause said amplifying means to be degenerative with respect to steady alternating currents of said selected frequency, and decoding apparatus controlled by said amplifying means and responsive to outputs of short duration resulting from the transient voltages existing in said receiver coils upon the application and removal of the coded rail currents to give distinctive indications in accordance with rate of recurrence of said transient voltages characteristic of the code rates selected in accordance with the different traffic conditions.

16. In a continuous inductive cab signal system of the character described operable on coded alternating current of a selected frequency comprising, track circuits including track rails having said coded currents applied thereto, vehicle-carried equipment having receiver windings mounted ahead of said vehicle in an inductive relation to the track rails and tuned to a frequency different from said selected frequency of the coded current in the track rails, said receiver windings having transient voltages induced therein upon the application and removal of the coded alternating rail current constituting each "on" period, amplifying circuit means including vacuum tubes for giving outputs of short duration in response to said transient voltages induced in said receiver windings, a noise eliminator comprising timing means being set into operation by an output from said amplifying means and effective to time a predetermined interval, said noise eliminator timing means maintained in its timing condition only by outputs received from said amplifying means with successive intervals less than said predetermined interval, and decoding means connected to said noise eliminator to receive a control each time said noise eliminator is initially operated, whereby coded alternating current on the rails may cause repeated outputs by said amplifying means to said noise eliminator to maintain it operated throughout each "on" period of the code to be resulting in but a single output to said decoding means for each such "on" period.

17. In a continuous inductive cab signalling system for railroads, track circuits including track rails with certain of said track circuits being supplied with coded direct currents and others being suplied with coded alternating currents and with the code rate for each such track circuit being selected in accordance with traffic conditions in advance, receivers mounted in front of a vehicle and in a position to be inductively associated with current flow in the track rails in advance of that vehicle, circuit elements for tuning said receivers to a particular frequency to provide a transient voltage having a natural period corresponding to said frequency for the beginning and end of each "on" period of a code for either said direct or said alternating coded currents, amplifying means including clipping and differentiating circuit elements for acting on the transient voltages induced in said windings to produce outputs of short duration for the transient voltage at the beginning and end of each code "on" period, circuit elements tuned to a frequency corresponding to the frequency of the alternating current in said track circuits and connected to said amplifying circuit means to reduce the effectiveness of any steady alternating current induced in said receivers by the alternating current in the track rails to cause said amplifying means to produce outputs the same as for said transient voltages, and decoding apparatus responsive to said outputs of short duration produced by said amplifying means and occurring at rates characteristic of the codes applied to said track rails to give distinctive indications in accordance with traffic conditions.

18. In a continuous inductive cab signal system for railroads having rail currents coded at different preselected rates dependent upon traffic conditions, each successive code cycle comprising an "on" period and an "off" period, train-carried equipment including receiver windings mounted adjacent the rails and in inductive relation to current flow in the track rails, amplifying circuit means connected to said receiver windings and including tuning and amplifying circuit elements effective to produce a short trigger pulse for the beginning and end of each code "on" period, a plurality of timers each being operative to measure a predetermined time following its initiation and each different timer measuring a time characteristic of one of said preselected code rates, a plurality of gating means one for each timer and each rendered momentarily effective at the end of the operation of its respective timer, circuit means for initiating each timer in response to a short trigger pulse from said amplifying circuit means if it is not then in operation, and control circuit means rendered effective when a succeeding pulse from said amplifying circuit means coincides with the rendering effective of one of said gating means.

19. In a continuous inductive cab signal system for railroads having rail currents coded at different preselected rates dependent upon traffic conditions, each successive code cycle of any rate comprising an "on" period and an "off" period, train-carried equipment including receiver windings mounted adjacent the rails to be responsive to changes in current flow in the track rails, amplifying circuit means connected to said receiver windings and including tuning and amplifying circuit elements effective to produce an output of short duration at the beginning and end of each code "on" period, decoding apparatus connected to said amplifying circuit means and including timing means set into operation by an output from said amplifying circuit means for measuring predetermined times corresponding to said preselected code rates, and circuit means conditioned momentarily at the end of each measured time to be responsive to the next successive output of said amplifying circuit means occurring at that time to give a distinctive control dependent upon the time having just been measured.

20. In a continuous inductive cab signal system for railroads having rail currents coded at different preselected rates dependent upon traffic conditions, each successive code cycle comprising an "on" period and an "off" period, vehicle-carried equipment including receiver windings mounted adjacent the rails and in inductive relation to current flow in the track rails, amplifying circuit means connected to said receiver windings and including tuning and amplifying circuit elements operative to produce a short trigger pulse for the beginning and end of each code "on" period, a plurality of timers each being operative to measure a predetermined time following its initiation and each different timer measuring a time characteristic of one of said preselected code rates, a plurality of gating means one for each timer and each rendered momentarily effective at the end of the operation of its respective timer, driver circuit means for initiating each timer in response to a short trigger pulse from said amplifying circuit means, blanking circuit means controlled by each timer while it is in a timing operation for preventing said driver circuit means from interrupting its timing operation then in progress, and control circuit means rendered effective when a succeeding pulse from said amplifying circuit means coincides with the rendering effective of one of said gating means.

21. In a continuous inductive cab signal system for railroads having rail currents coded at different predetermined rates dependent upon traffic conditions, each successive code cycle comprising an "on" period and an "off" period, vehicle-carried equipment including receiver windings mounted in front of the vehicle adjacent the rails, amplifying circuit means connected to said receiver windings and including tuning and amplifying circuit elements operative to produce a short trigger pulse for the beginning and end of each "on" period, a plurality of timers each being operative to measure a predetermined time following its initiation and each different timer measuring a time corresponding to the code cycle time for one of said predetermined code rates, a plurality of gating means one for each timer and each rendered momentarily effective at the end of the operation of its respective timer, driver circuit means for initiating each timer in response to a short trigger pulse from said amplifying circuit means, blanking circuit means controlled by each timer for causing said driver circuit means from being rendered effective by its associated timer while that timer is in operation, and control circuit means rendered effective when a succeeding pulse from said amplifying circuit means coincides with the rendering effective of one of said gating means, whereby said control circuit means is rendered effective at the beginning or at the end of each successive "on" period depending upon which has first inductively affected said receiver windings.

22. In a continuous inductive cab signal system for railroads having rail currents coded at different predetermined rates dependent upon traffic conditions, each successive code cycle comprising an "on" period and an "off" period, vehicle-carried equipment including receiver windings mounted adjacent the rails in front of the vehicle, amplifying circuit means connected to said receiver windings and including tuning and amplifying circuit elements effective to produce a short trigger pulse for the beginning and end of each code "on" period, a plurality of code rate discriminators, one for each different one of said predetermined code rates and each such discriminator including a plurality of timers each being operative to measure a predetermined time following its initiation and each timer of a particular discriminator measuring a time characteristic of the corresponding code rate for that discriminator, a plurality of gating means one for each timer and each rendered momentarily effective at the end of the operation of its respective timer, circuit means for initiation of the first timer of each discriminator in response to a short trigger pulse from said amplifying circuit means if that timer is not then in operation, other circuit means for initiating the next timer in order for each discriminator when the gating means for the preceding timer is again restored after having been momentarily rendered effective, and control circuit means associated with each of said code rate discriminators and rendered effective when a succeeding pulse from said amplifying circuit means coincides with the rendering effective of a plurality of said gating means for that one of said plurality of code rate discriminators.

23. In a continuous inductive cab signal system for railroads having rail currents coded at different preselected rates dependent upon traffic conditions, each successive code cycle comprising an "on" period and an "off" period, vehicle-carried equipment including receiver windings mounted adjacent the rails and in inductive relation to current flow in the track rails, amplifying circuit means connected to said receiver windings and including tuning and amplifying circuit elements operative to produce an output for the beginning and end of each code "on" period, a plurality of code rate discriminators, one for each different one of said predetermined code rates, and each such code rate discriminator including a plurality of timers each being operative to measure a predetermined time following its initiation and each timer for a particular discriminator measuring a time characteristic of the predetermined code rate assigned to that discriminator, a plurality of gating means one for each timer of each discriminator and each rendered momentarily effective at the end of the operation of its respective timer, driver circuit means for initiating the first timer of each code rate discriminator in response to an output from said amplifying circuit means providing that timer is not then in operation, other circuit means for each code rate discriminator effective to initiate a succeeding timer upon the restoration of the gating means for the preceeding timer following its having been rendered effective, blanking circuit means controlled by the first timer of each code rate discriminator while that timer is in operation for preventing said driver circuit means from acting upon that timer in response to any output of said amplifying circuit means, and control circuit means associated with each code rate discriminator and rendered effective when a succeeding output from said amplifying circuit means coincides with the rendering effective of all of the gating means of that code rate discriminator.

24. In a continuous inductive cab signal system for railroads having rail currents coded at different predetermined rates dependent upon traffic conditions, each successive code cycle comprising an "on" period and an "off" period, vehicle-carried equipment including receiver windings mounted adjacent the rails and in inductive relation to current flow in such track rails, amplifying circuit means connected to said receiver windings and including tuning and amplifying circuit elements operative to produce an output of short duration at the beginning and at the end of each code "on" period, a plurality of code rate discriminators, one for each different one of said predetermined code rates, and each such code rate discriminator including a plurality of timers each being operative to measure a time corresponding to the code rate assigned to its discriminator, a plurality of gating means associated with said different code rate discriminators one gating means for each timer and each such gating means rendered momentarily effective at the end of the operation of its respective timer, driver circuit means for initiating the first timer of each discriminator in response to an output of said amplifying circuit means if such driver circuit means is not rendered inactive for that code rate discriminator, blanking circuit means controlled by the first timer of each code rate discriminator while that first timer is in operation to render said driver circuit means inactive with respect to such first timer of that code rate discriminator while a timing operation is in progress, other driver circuit means associated with the other timers of each code rate discriminator for initiating the next timer upon the restoration to its normal condition of the gating means for the preceding timer, whereby the timers for each code rate discriminator are set into operation one at a time in turn, and control circuit means associated with each code rate discriminator and rendered effective when said amplifying circuit means provides a successive output which occurs simultaneously with the rendering effective of all of the gating means of that code rate discriminator.

25. In a continuous inductive cab signal system for railroads having rail currents coded at different predetermined rates dependent upon traffic conditions, each successive code cycle comprising an "on" period and an "off" period, train-carried equipment including receiver windings mounted adjacent the rails and in inductive relation thereto, amplifying circuit means connected to said receiver windings and including tuning and amplifying circuit elements effective to produce an output of short duration for the beginning and end of each code "on" period, a preliminary timer connected to said amplifying circuit means and operative to measure a relatively short predetermined time following its initiation in response to an output of said amplifying circuit means, a plurality of code rate timers each being operative to measure a predetermined time following its initiation and each timer measuring a time characteristic of one of said predetermined code rates, a plurality of gating means one for each of said code rate timers and each rendered momentarily effective at the end of the operation of its respective timer, circuit means for initiating each code rate timer in response to the completion of an operation of said preliminary timer if such code rate timer is not then in operation, and control circuit means rendered effective when a succeeding output from said amplifying circuit means occurs simultaneously with the rendering effective of said gating means for one of said code rate timers.

26. In a cab signalling system for railroads, a plurality of track sections each including track rails and being located end to end and each having coded alternating current applied thereto at different rates in accordance with traffic conditions, code detection means including receiver windings mounted on a vehicle in inductive relation to the track rails and also including amplifying means and circuit elements responsive to the application and removal of alternating current to provide an output upon each application and each removal of the coded alternating current under normal amplitudes of the coded current, but acting when the coded currents are of large amplitude to produce outputs for successive cycles of the alternating current in the track rails, timing circuit means effective to measure a predetermined interval of time longer than the interval between the outputs of said code detection means when the alternating current is of relatively high amplitude, said timing means being normally initiated into operation by an output of said code detection means both upon the application and removal of the coded alternating current in the track rails, decoding means controlled by outputs occurring upon the initiation of said timing means to give a different indication for the different code rates, and blanking circuit means for preventing the output of said timer from being effective for alternate outputs under normal conditions of coded rail currents.

References Cited in the file of this patent

UNITED STATES PATENTS

| | | |
|---|---|---|
| 1,531,574 | Ruthven | Mar. 31, 1925 |
| 2,197,416 | Place | Apr. 16, 1940 |
| 2,200,188 | Nicholson | May 7, 1940 |
| 2,293,307 | Place | Aug. 18, 1942 |
| 2,312,050 | Place | Feb. 23, 1943 |
| 2,349,987 | Place | May 30, 1944 |
| 2,371,568 | Wintsch | Mar. 13, 1945 |
| 2,503,671 | Hughson | Apr. 11, 1950 |
| 2,693,525 | Kendall et al. | Nov. 2, 1954 |